United States Patent
Nagano et al.

(10) Patent No.: US 9,793,837 B2
(45) Date of Patent: Oct. 17, 2017

(54) MOTOR DRIVER AND CONTROL METHOD

(71) Applicant: PANASONIC INTELLECTUAL PROPERTY MANAGEMENT CO., LTD., Osaka (JP)

(72) Inventors: Tetsu Nagano, Osaka (JP); Tomoyoshi Morita, Hyogo (JP); Shinichi Kuroshima, Osaka (JP); Taishi Iwanaga, Shizuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/152,475

(22) Filed: May 11, 2016

(65) Prior Publication Data
US 2016/0254765 A1    Sep. 1, 2016

Related U.S. Application Data

(63) Continuation of application No. PCT/JP2014/003831, filed on Jul. 18, 2014.

(30) Foreign Application Priority Data

Nov. 13, 2013  (JP) ................................ 2013-235053

(51) Int. Cl.
*H02P 23/12*  (2006.01)
*H02P 6/14*   (2016.01)
(Continued)

(52) U.S. Cl.
CPC ................. *H02P 6/14* (2013.01); *H02P 6/08* (2013.01); *H02P 6/16* (2013.01)

(58) Field of Classification Search
CPC .... H02P 6/142; H02P 6/06; H02P 6/08; H02P 27/06; B60L 11/1803
(Continued)

(56) References Cited

U.S. PATENT DOCUMENTS 5,583,411 A     12/1996 Kusano et al.
2005/0275362 A1 12/2005 Yamamoto et al.
(Continued)

FOREIGN PATENT DOCUMENTS

JP     6-62592 A    3/1994
JP     07-184384   7/1995
(Continued)

OTHER PUBLICATIONS

International Search Report and Written Opinion issued in corresponding International Patent Application No. PCT/JP2014/003831, dated Aug. 12, 2014; with partial English translation.

*Primary Examiner* — Rina Duda
(74) *Attorney, Agent, or Firm* — McDermott Will & Emery LLP

(57) ABSTRACT

Disclosed herein is a motor driver including: a motor current phase detector configured to detect a motor current phase and output a result of the detection as motor current phase information; a motor phase detector configured to detect a motor phase and output a result of the detection as motor phase information; a phase correction value calculator configured to calculate a correction value based on a difference between the motor current phase information and the motor phase information and output a result of the calculation as compensation information; and a motor applied voltage calculator configured to calculate a motor applied voltage representing a voltage to be applied to the motor based on the compensation information and motor phase information received and output a result of the calculation as a phase-compensated motor applied voltage signal.

19 Claims, 34 Drawing Sheets

(51) Int. Cl.
*H02P 6/16* (2016.01)
*H02P 6/08* (2016.01)

(58) Field of Classification Search
USPC .................. 318/400.14, 400.15, 798, 800
See application file for complete search history.

(56) References Cited

U.S. PATENT DOCUMENTS

| | | | | |
|---|---|---|---|---|
| 2006/0055352 | A1* | 3/2006 | Mori | H02P 6/10 |
| | | | | 318/432 |
| 2006/0290312 | A1* | 12/2006 | Nagai | H02P 25/024 |
| | | | | 318/599 |
| 2008/0201041 | A1 | 8/2008 | Jiang | |
| 2011/0219816 | A1* | 9/2011 | Tanaka | H02P 6/18 |
| | | | | 62/498 |
| 2011/0279070 | A1* | 11/2011 | Tanaka | H02P 6/181 |
| | | | | 318/400.1 |
| 2013/0271823 | A1* | 10/2013 | Ito | G02F 2/00 |
| | | | | 359/325 |

FOREIGN PATENT DOCUMENTS

| | | |
|---|---|---|
| JP | 2004-336876 A | 11/2004 |
| JP | 2006-034086 A | 2/2006 |
| JP | 2008-125246 A | 5/2008 |
| JP | 2008-189225 A | 8/2008 |
| JP | 2009-033922 A | 2/2009 |

\* cited by examiner

DURING HIGH-SPEED DRIVING WITH PHASE COMPENSATED

DURING HIGH-SPEED DRIVING WITH CURRENT PHASE LAG

MOTOR DRIVER AND CONTROL METHOD

CROSS-REFERENCE TO RELATED APPLICATION

This is a continuation of International Application No. PCT/JP2014/003831 filed on Jul. 18, 2014, which claims priority to Japanese Patent Application No. 2013-235053 filed on Nov. 13, 2013. The entire disclosures of these applications are hereby incorporated by reference.

BACKGROUND

The present disclosure relates to a motor driver and a control method, and more particularly relates to DC brushless motor driving control.

While a DC brushless motor is being driven at high speeds, the phase of the motor current may shift with respect to the phase of the motor due to an induced voltage generated in the motor and other factors to cause a decrease in efficiency, even though the motor is still drivable anyway. Thus, to cope with this problem, a known driver attempts to improve the efficiency of a motor to use by recording its characteristic in advance and by performing phase compensation according to its drive frequency.

FIG. 33 is a block diagram illustrating a configuration for a conventional motor driver/control method. The motor driver/control method shown in FIG. 33 comprises: a correction value table block 2502 for outputting, in response to a correction value selection signal 2501, a correction value from a correction value table on which the correction value has been recorded in advance in accordance with the characteristic of the motor to use; the function of detecting the phase of the motor in which a motor drive period is output in response to a motor phase signal 2503 (illustrated as a motor phase detector 2504); and the function of computing a motor applied voltage signal 2506 based on the correction value and motor drive period provided (illustrated as a motor applied voltage calculator 2505).

FIGS. 34A and 34B are timing charts illustrating how the conventional motor driver/control method works. In these timing charts, the motor is supposed to be a triphase brushless motor as an example. In these drawings, output terminals to drive the motor are identified by U, V, and W, and their associated Hall signals are identified by HU, HV, and HW, respectively. If no phase compensation is performed, the motor current phase has a phase lag with respect to the Hall signal as shown in FIG. 34A. On the other hand, if phase compensation is performed, the motor current phase maintains an appropriate phase difference with respect to the Hall signal.

See, for example, Japanese Unexamined Patent Publication No. 2008-125246.

However, such phase compensation is performed with the characteristic of the motor recorded in advance after the characteristic of the motor has been adjusted to a particular motor constant. Thus, if the same motor driver/control method is applied to a motor with a different motor constant, then the drive efficiency will decrease. That is why such a driver/method lacks in broad applicability.

In view of the foregoing background, the present disclosure provides a motor driver and control method which contributes to maintaining high drive efficiency and which is applicable broadly enough to avoid depending on the characteristic of any particular motor.

SUMMARY

To overcome the problem described above, the present disclosure takes the following measure. Specifically, a motor driver according to the present disclosure includes: a motor current phase detector configured to detect a motor current phase in response to a motor current phase signal received and output a result of the detection as motor current phase information; a motor phase detector configured to detect a motor phase in response to a motor phase signal received and output a result of the detection as motor phase information; a phase correction value calculator configured to calculate a correction value based on a difference between the motor current phase information and the motor phase information and output a result of the calculation as compensation information; and a motor applied voltage calculator configured to calculate a motor applied voltage representing a voltage to be applied to the motor based on the compensation information and motor phase information received and output a result of the calculation as a phase-compensated motor applied voltage signal.

According to the present disclosure, the motor phase and motor current phase may be kept constant irrespective of the characteristic of the motor. This thus provides a motor driver and control method which achieves high drive efficiency and which is applicable broadly enough to avoid depending on the characteristic of any particular motor.

DETAILED DESCRIPTION

Figure 1:
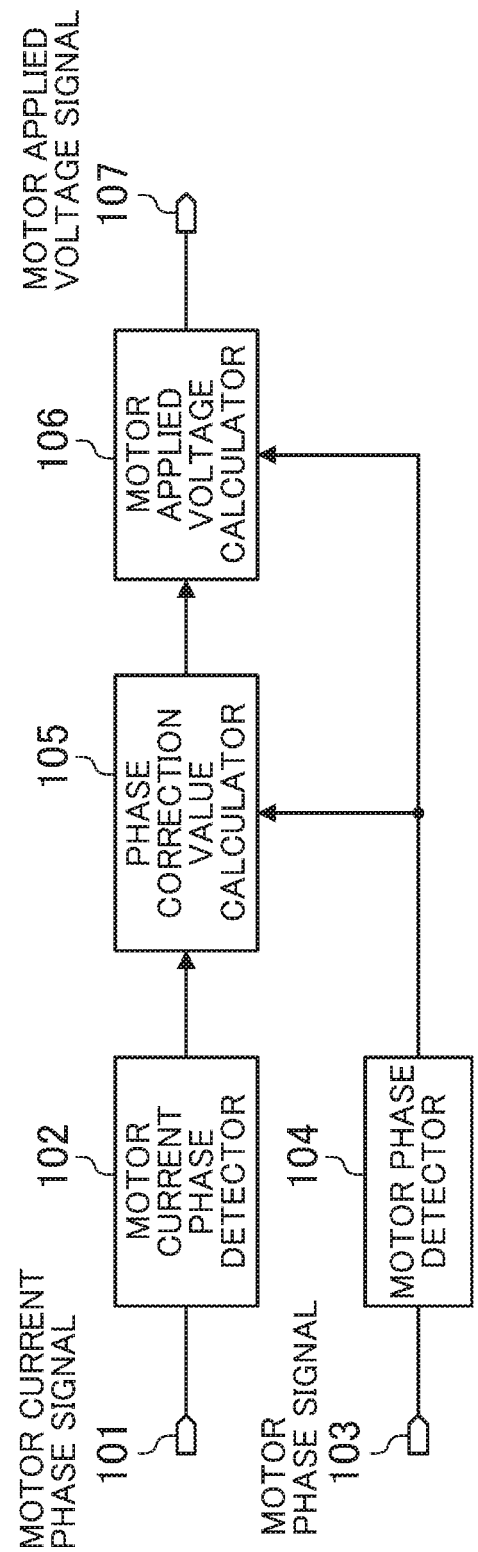
FIG. 1 is a block diagram illustrating a motor driver and control method according to a first embodiment.

Embodiments of the present disclosure will now be described with reference to the accompanying drawings. In the following description of a motor driver and control method, the description of inessentials of the driver or method that have nothing to do with the spirit of the present disclosure may be partially omitted.

Each of the timing charts to be referred to in the following description of embodiments shows how a triphase brushless motor works. In the drawings, the output terminals to drive the motor are identified by U, V, and W, and their associated Hall signals are identified by HU, HV, and HW, respectively.

Note that this is only a non-limiting exemplary embodiment of the present disclosure and the triphase brushless motor does not have to be used according to the present disclosure. Alternatively, the present invention is also applicable to an actuator, for example. Also, in the following description, a Hall signal is supposed to be used as the motor phase signal. Naturally, however, the motor phase signal does not have to be a Hall signal. Rather, the motor phase signal may be any other kind of signal as long as a motor phase may be detected with a counter-electromotive voltage of the motor, for example. The same can be said about any of the various embodiments to be described below.

First Embodiment

FIG. 1 is a block diagram illustrating a motor driver and control method according to a first embodiment. The motor driver shown in FIG. 1 includes: a motor current phase detector 102 which detects a motor current phase in response to a motor current phase signal 101 received and outputs a result of the detection as motor current phase information; a motor phase detector 104 which detects a motor phase in response to a motor phase signal 103 received and outputs a result of the detection as motor phase information; a phase correction value calculator 105 which calculates a correction value to perform phase compensation based on the difference between the motor current phase information and the motor phase information and outputs compensation information as a result of the calculation; and a motor applied voltage calculator 106 which calculates a motor applied voltage representing a voltage to be applied to the motor based on the compensation information and motor phase information received and outputs a phase-compensated motor applied voltage signal 107 as a result of the calculation.

The motor driver shown in FIG. 1 may perform compensation on the motor phase by performing a control operation in the following manner, for example.

When the motor current phase signal 101 is input to the motor current phase detector 102, the motor current phase detector 102 outputs the motor current phase information. Meanwhile, when the motor phase signal 103 is input to the motor phase detector 104, the motor phase detector 104 outputs the motor phase information. The phase correction value calculator 105 compares the motor current phase information and the motor phase information to each other, calculates such a correction value as to allow the motor current to maintain an appropriate phase difference with respect to the motor phase information, and outputs the correction value as compensation information. When the compensation information represented as a correction value and the motor phase information are input to the motor applied voltage calculator 106, the motor applied voltage calculator 106 generates a compensated motor applied voltage signal 107 to be applied to the motor. Then, the motor applied voltage signal 107 is supplied to a triphase brushless motor functioning as a DC brushless motor.

By controlling the motor driver in this manner, the motor current phase and the motor phase are allowed to maintain an appropriate phase difference between them such that the motor may be driven with high efficiency. In addition, since the motor current phase and the motor phase may be compensated for every time these phases are detected, this method has versatility that is broad enough to avoid depending on the characteristic of any particular motor.

Second Embodiment

In a motor driver according to a second embodiment, the motor applied voltage calculator 106 shown in FIG. 1 is modified so as to update the compensated motor phase information, and generate the motor applied voltage signal 107 to be applied to the motor, on each of arbitrary discrete phases of the motor.

Figure 2:
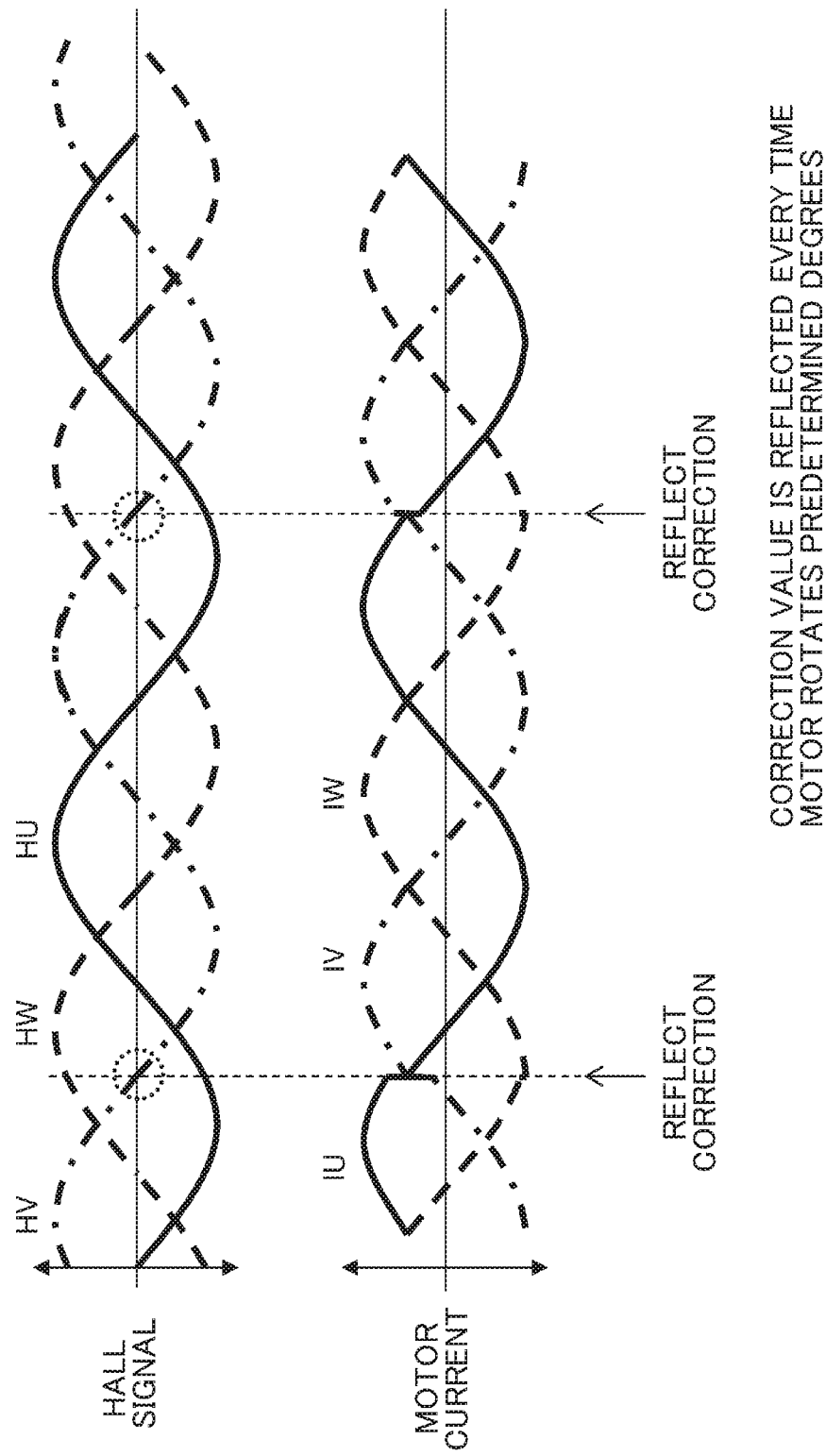
FIG. 2 is a timing chart illustrating a motor driver and control method according to a second embodiment.

FIG. 2 is a timing chart illustrating a motor driver and control method according to this embodiment. In the example illustrated in FIG. 2, the correction value is reflected on the output applied voltage on every falling edge of the Hall signal HV, i.e., every 360 electrical degrees.

Although the constant phase angle of the motor is supposed to be 360 electrical degrees in the example illustrated in FIG. 2, naturally, the constant phase angle of the motor does not have to be 360 electrical degrees, but the correction value may be reflected at any arbitrary phase angle.

By adopting such a configuration, an appropriate phase difference may be maintained according to this embodiment between the motor current phase and the motor phase at every constant phase angle of the motor.

Third Embodiment

Figure 3:
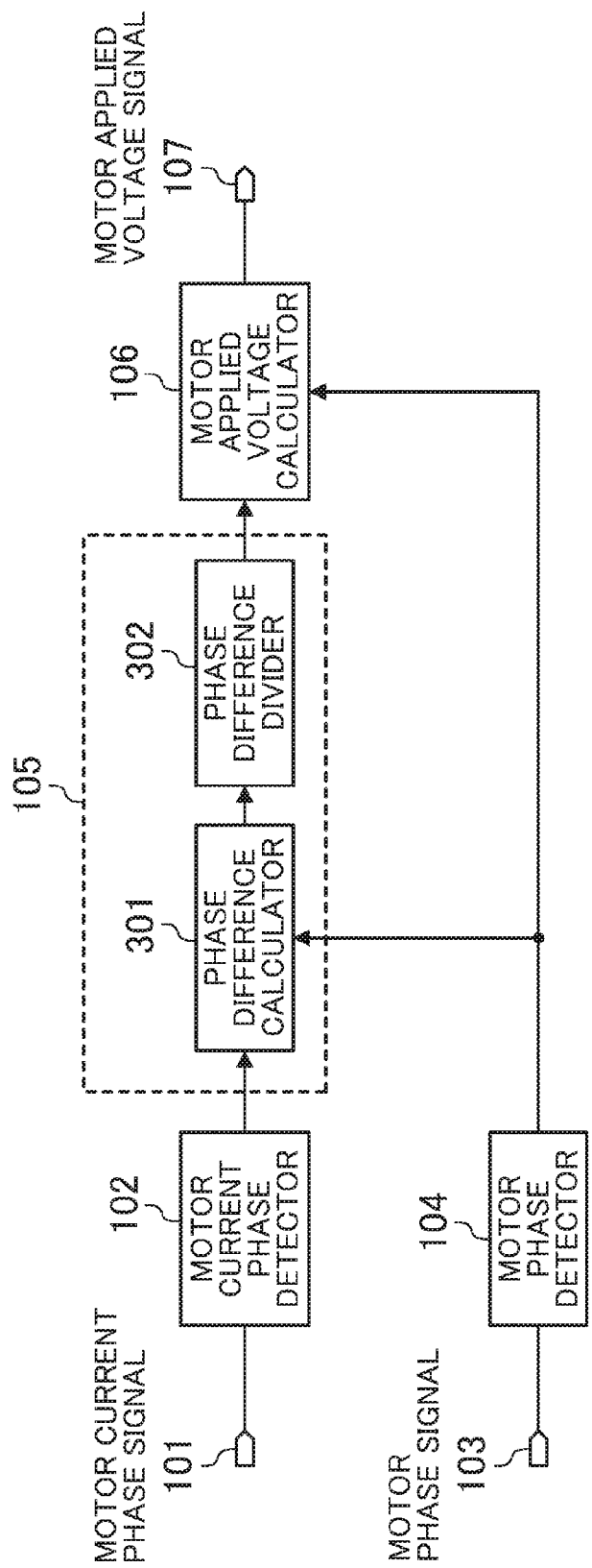
FIG. 3 is a block diagram illustrating a motor driver and control method according to a third embodiment.

FIG. 3 is a block diagram illustrating a motor driver and control method according to a third embodiment. In this embodiment, the phase correction value calculator 105 includes a phase difference calculator 301 and a phase difference divider 302.

The phase difference calculator 301 calculates a correction value based on the difference between the motor current phase information and the motor phase information and outputs a result of the calculation as phase difference information that is an exemplary form of the compensation information. That is to say, the phase difference calculator 301 calculates and outputs the phase difference between the motor current phase information and the motor phase information.

The phase difference divider 302 divides the phase difference information provided by the phase difference calculator 301, thereby dividing the phase difference between the motor current phase information and the motor phase information. If the phase needs to be compensated for, the phase difference divider 302 outputs those pieces of divided phase difference information (i.e., divided correction values) in multiple separate stages.

Figure 4:
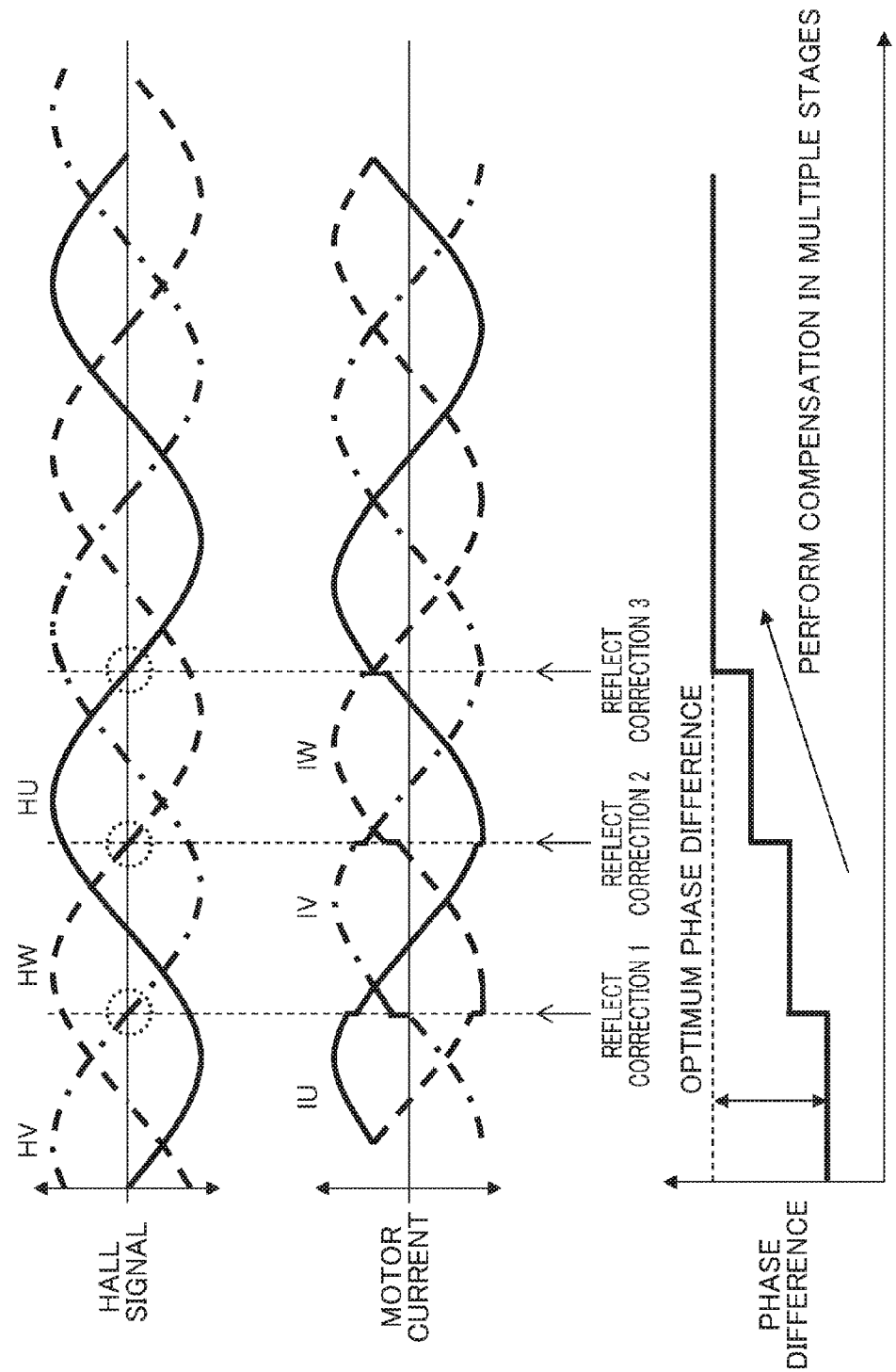
FIG. 4 is a timing chart illustrating the motor driver and control method according to the third embodiment.

FIG. 4 is a timing chart illustrating the motor driver and control method according to the third embodiment. In the embodiment illustrated in FIG. 4, the phase difference detected is compensated for by being divided into three on the respective falling edges of the Hall signals HU, HV, and HW.

Although no weights are added to the correction value to be divided, or no other additional processing is performed, in the example illustrated in FIG. 4, the correction value may naturally be divided evenly, or the correction values divided may be mutually different from each other. That is to say, the correction values divided may be set arbitrarily. Also, even though the correction value is divided into three in the example described above, this is only an example, and the correction value may also be divided into any other arbitrary number of values. Likewise, the timings to compensate for the phase difference do not have to be the respective falling edges of the Hall signals HU, HV, and HW, either, but may also be set to be any other arbitrary timings.

By adopting such a configuration, an appropriate phase difference may be maintained according to this embodiment between the motor current phase and the motor phase with drive control performed such that the compensation is made in multiple stages.

Fourth Embodiment

Figure 5:
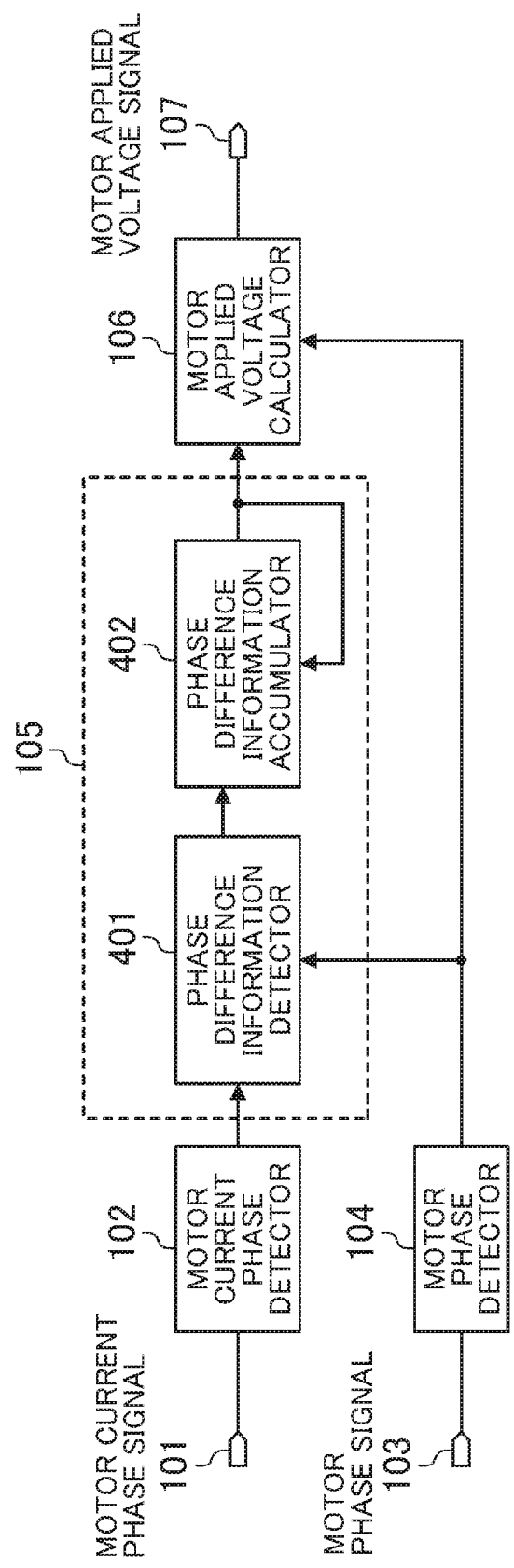
FIG. 5 is a block diagram illustrating a motor driver and control method according to a fourth embodiment.

FIG. 5 is a block diagram illustrating a motor driver and control method according to a fourth embodiment. In this embodiment, the phase correction value calculator 105 includes a phase difference information detector 401 and a phase difference information accumulator 402.

The phase difference information detector 401 detects a phase difference as either a phase lead or a phase lag based on the difference between the motor current phase information and the motor phase information, and outputs phase difference information as a result of the detection.

The phase difference information accumulator 402 calculates the correction value by accumulating the phase difference information provided by the phase difference information detector 401, retains the correction value, and outputs the correction value as the compensation information.

Figure 6:
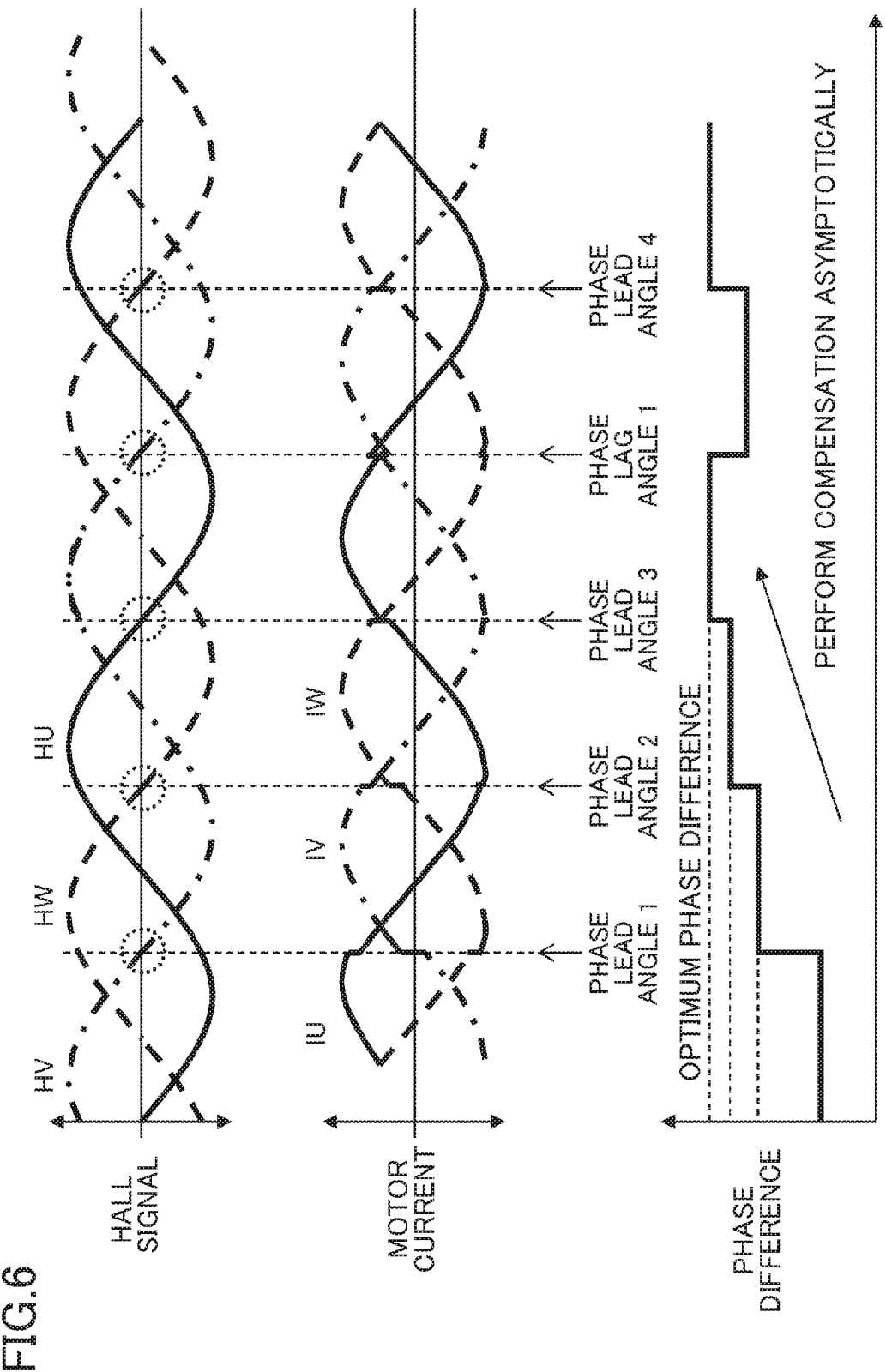
FIG. 6 is a timing chart illustrating the motor driver and control method according to the fourth embodiment.

FIG. 6 is a timing chart illustrating the motor driver and control method according to this embodiment. In this embodiment, the compensation is performed asymptotically such that the phase difference between the Hall signals and the motor current converges to an appropriate value on the respective falling edges of the Hall signals HU, HV, and HW. Since the phase difference information is about a phase difference that is either a phase lead or a phase lag, the convergence is achieved with certain amplitude.

In the example illustrated in FIG. 6, weights are supposed to be added to the asymptotic correction values. Naturally, however, the asymptotic correction values may be either equal to each other or different from each other, and may be set arbitrarily. In addition, the timings to compensate for the phase difference do not have to be the falling edges of the Hall signals HU, HV, HW, but may also be set to be any arbitrary timings.

By adopting such a configuration, an appropriate phase difference may be maintained according to this embodiment between the motor current phase and the motor phase with drive control performed such that the compensation is performed asymptotically.

Fifth Embodiment

In a fifth embodiment, the phase difference information detector 401 of the phase correction value calculator 105 shown in FIG. 5 may detect a phase difference as a phase lead, a phase lag or a phase match based on the difference between the motor current phase information and the motor phase information, and may output phase difference information as a result of the detection.

Figure 7:
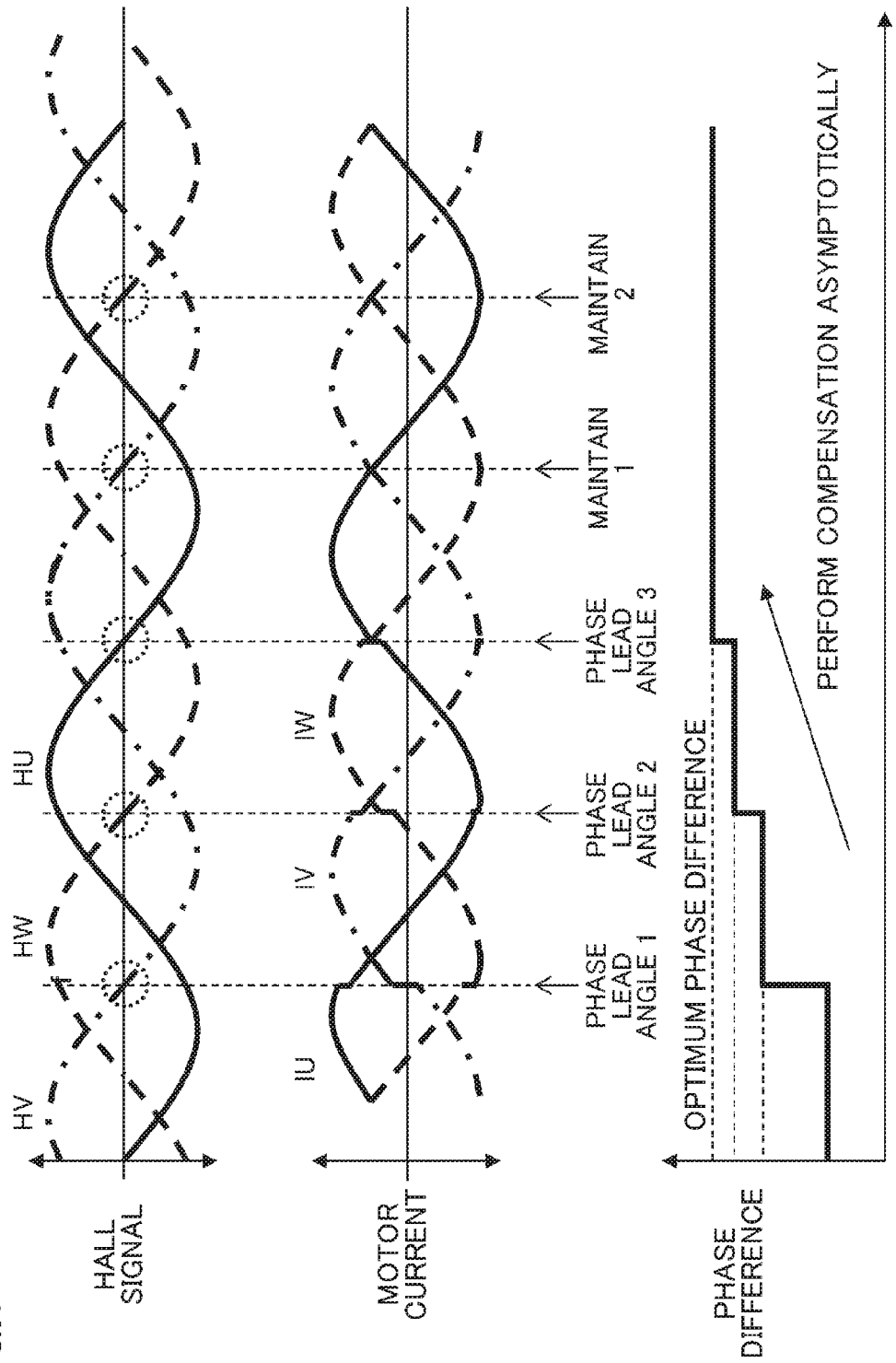
FIG. 7 is a timing chart illustrating a motor driver and control method according to a fifth embodiment.

FIG. 7 is a timing chart illustrating a motor driver and control method according to this embodiment. In this embodiment, the compensation is performed asymptotically such that the phase difference between the Hall signals and the motor current converges to an appropriate value on the respective falling edges of the Hall signals HU, HV, and HW. An appropriate phase difference will be maintained by outputting a maintaining signal from the phase difference information detector 401 once the phase difference has converged to an appropriate value.

In the example illustrated in FIG. 7, weights are supposed to be added to the asymptotic correction values. Naturally, however, the asymptotic correction values may be either equal to each other or different from each other, and may be set arbitrarily. In addition, the timings to compensate for the phase difference do not have to be the falling edges of the Hall signals HU, HV, HW, but may also be set to be any arbitrary timings.

By adopting such a configuration, an appropriate phase difference may be maintained according to this embodiment between the motor current phase and the motor phase with drive control performed such that the compensation is performed asymptotically.

Sixth Embodiment

In a motor driver according to a sixth embodiment, the phase correction value calculator 105 shown in FIG. 1 may fetch the motor current phase information at arbitrary discrete timings.

Figure 8:
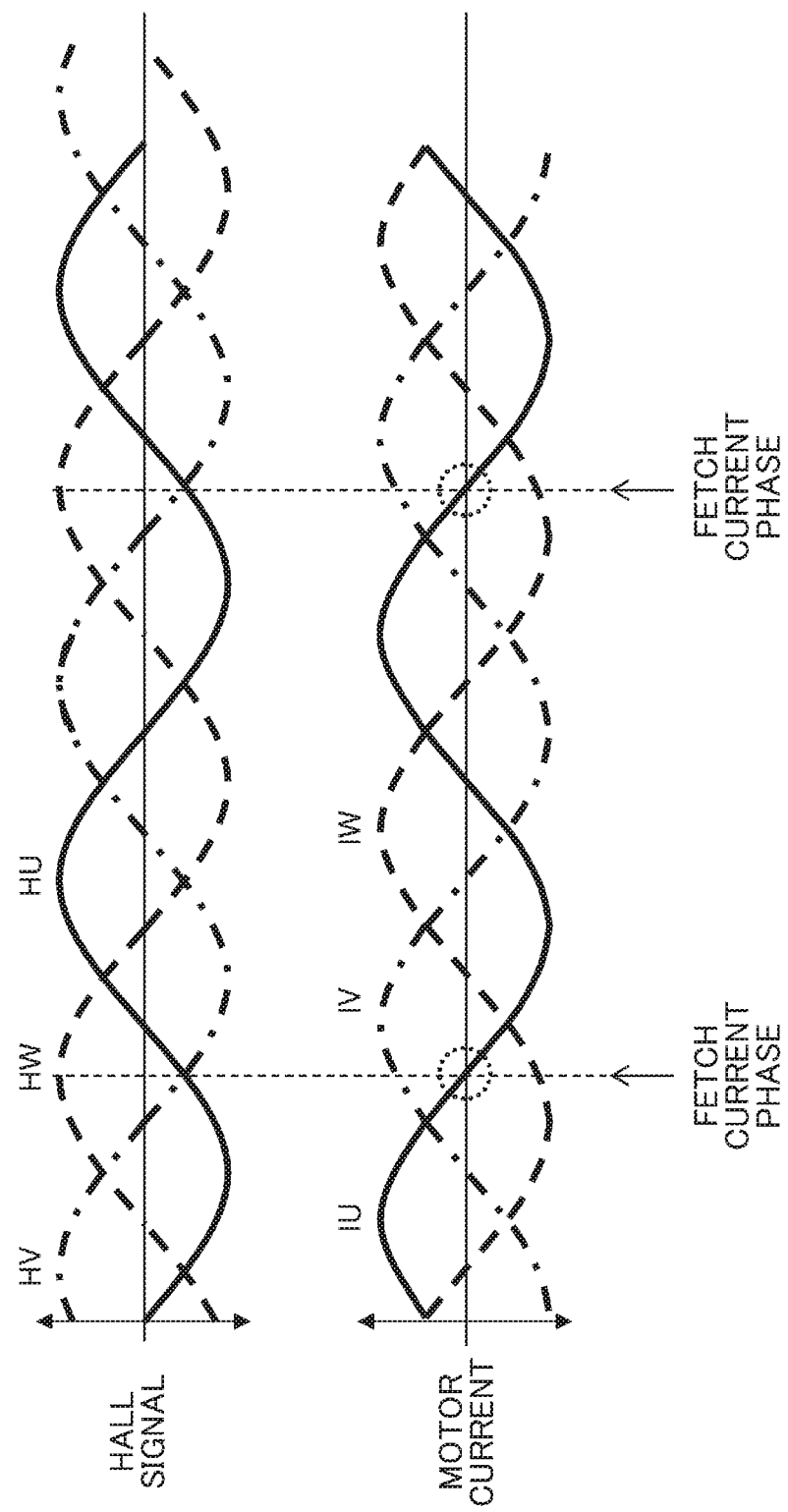
FIG. 8 is a timing chart illustrating a motor driver and control method according to a sixth embodiment.

FIG. 8 is a timing chart illustrating a motor driver and control method according to this embodiment. In the example illustrated in FIG. 8, the motor current phase information is supposed to be fetched on every falling edge of motor current IU.

Although the motor current phase information is supposed to be fetched in FIG. 8 on every falling edge of motor current IU, the motor current phase information naturally does not have to be fetched on every falling edge of the motor current IU, but may also be fetched at any arbitrary discrete timings.

By adopting such a configuration, the motor current phase information may be updated discretely according to this embodiment, and therefore, an appropriate phase difference may be maintained between the motor current phase and the motor phase.

Seventh Embodiment

In a motor driver according to a seventh embodiment, the phase correction value calculator 105 shown in FIG. 1 may determine the timing to fetch the motor current phase information based on motor phase information.

Figure 9:
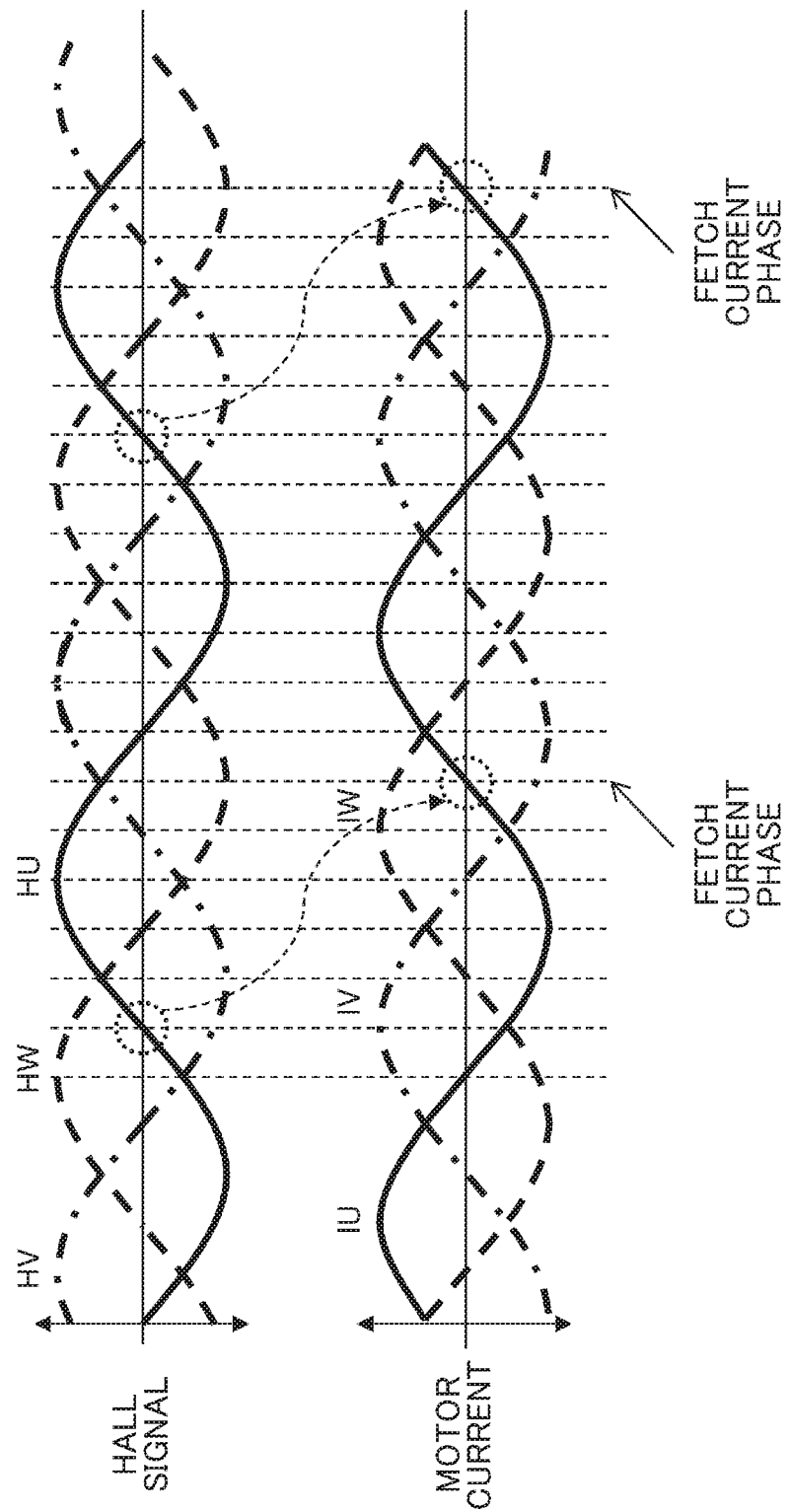
FIG. 9 is a timing chart illustrating a motor driver and control method according to a seventh embodiment.

FIG. 9 is a timing chart illustrating a motor driver and control method according to this embodiment. In the example illustrated in FIG. 9, the motor current phase information of the motor current IU is fetched at a timing represented by an electrical angle of around 150 degrees with respect to a rising edge of the Hall signal HU.

Although an exemplary combination of the Hall signal HU and the motor current IU is illustrated in FIG. 9, naturally this is not the only combination. Rather, the timings may also be set based on any other combination of an arbitrary motor current phase and an arbitrary Hall signal or a combination of multiple motor current phases and multiple Hall signals.

By adopting such a configuration, the motor current phase information may be updated according to this embodiment at a timing determined by the motor phase information, and an appropriate phase difference may be maintained between the motor current phase and the motor phase.

Eighth Embodiment

In a motor driver according to an eighth embodiment, the motor phase detector 104 shown in FIG. 1 may output present motor phase information based on past motor phases.

Figure 10:
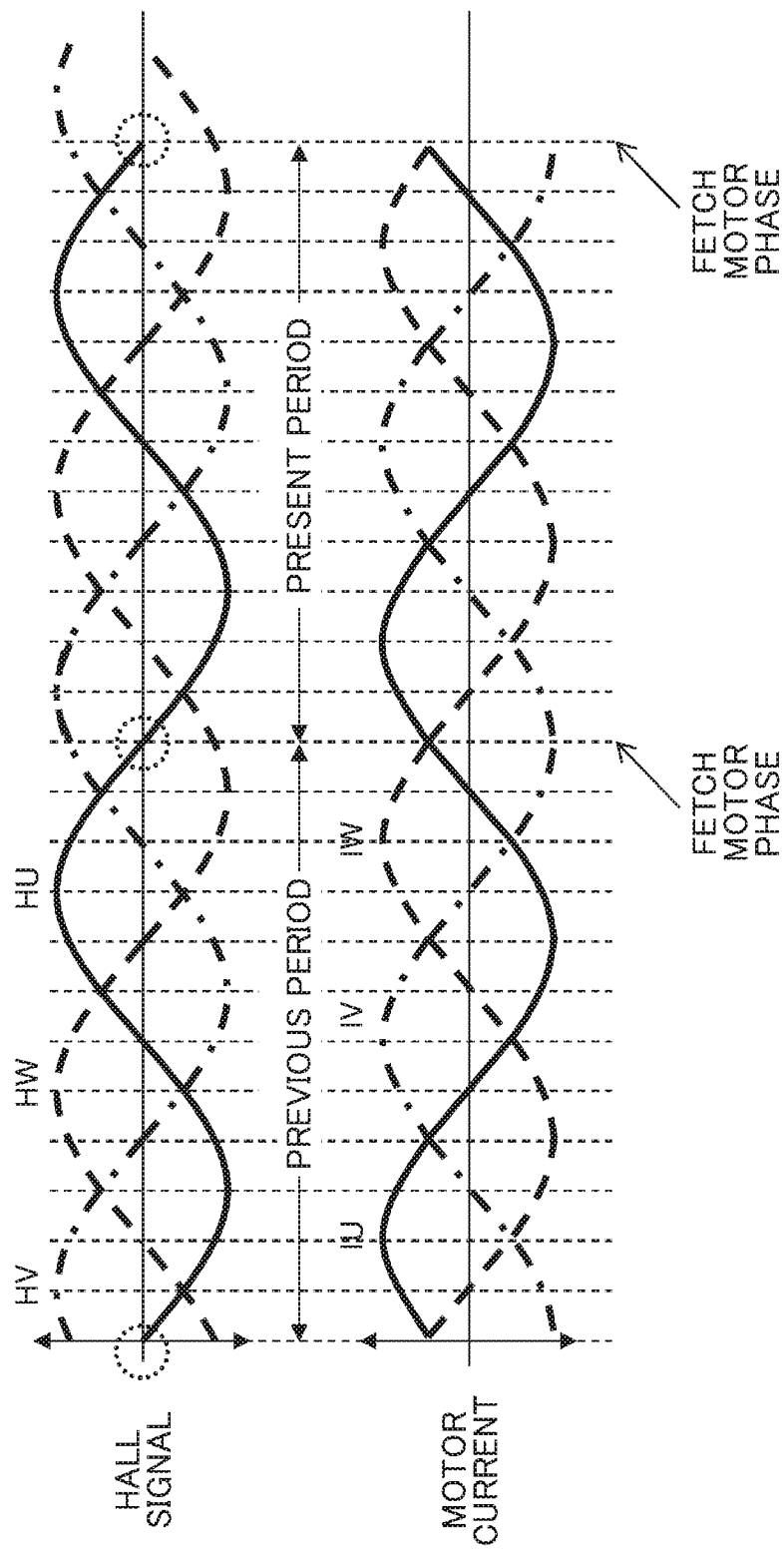
FIG. 10 is a timing chart illustrating a motor driver and control method according to an eighth embodiment.

FIG. 10 is a timing chart illustrating a motor driver and control method according to this embodiment. In the example illustrated in FIG. 10, the motor phase information is updated on the falling edges of the Hall signal HU such that the period between a first pair of falling edges of the Hall signal HU is almost as long as the period between a second pair of falling edges of the Hall signal HU.

In the example illustrated in FIG. 10, the next motor phase information is supposed to be updated based on the previous period of the Hall signal HU. Naturally, however, the previous period does not have to be used. Alternatively, the average of a few past periods may also be used, for example. Furthermore, the Hall signal to use may also be any arbitrary signal or any arbitrary set of signals. For example, the motor phase information may be updated between the respective falling edges of different Hall signals HU and HV. Moreover, the timing to update the motor phase information may also be any arbitrary timing as well.

Ninth Embodiment

In a motor driver according to a ninth embodiment, the phase correction value calculator 105 shown in FIG. 1 may calculate a correction value by detecting the difference between the motor current phase information and the motor phase information plural times every time phase compensation is performed.

Figure 11:
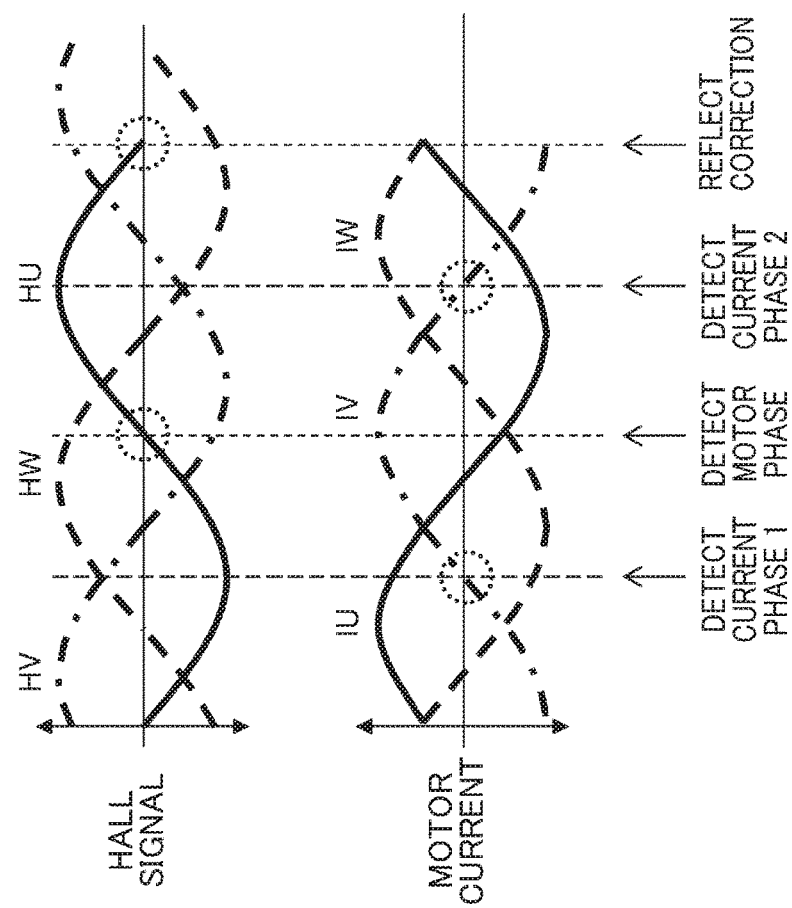
FIG. 11 is a timing chart illustrating a motor driver and control method according to a ninth embodiment.

FIG. 11 is a timing chart illustrating a motor driver and control method according to this embodiment. In the example illustrated in FIG. 11, the motor current phase information on rising and falling edges of the motor current IV is compared to the motor phase information on a rising edge of the Hall signal HU, and the correction value is reflected on a falling edge of the Hall signal HU.

In the example illustrated in FIG. 11, a correction value is calculated using the Hall signal HU and the motor current IV within one period of the Hall signal HU. Naturally, however, any arbitrary signal or any arbitrary set of signals may also be used as the Hall signal and motor current. Likewise, the correction value does not have to be calculated within one period, either, but may also be calculated either every predetermined number of periods or even every time less than one period passes. Furthermore, the motor phase information and motor current phase information may also be updated at arbitrary timings as well.

Tenth Embodiment

Figure 12:
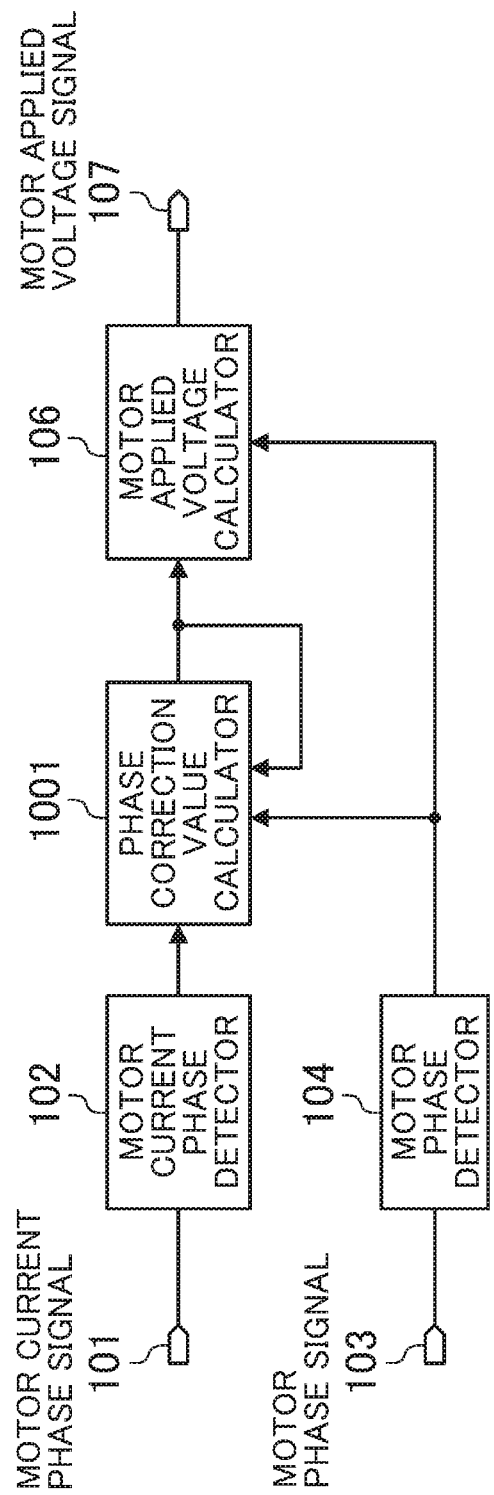
FIG. 12 is a block diagram illustrating a motor driver and control method according to a tenth embodiment.

FIG. 12 is a block diagram illustrating a motor driver and control method according to a tenth embodiment. In the motor driver according to the tenth embodiment, the phase correction value calculator 1001 is configured to maintain, once a phase difference between the motor current phase and the motor phase reaches a predetermined value, that phase difference after that. As used herein, the "predetermined value" refers to an appropriate phase difference between the motor current phase information and the motor phase information when a motor is driven, for example.

Figure 13:
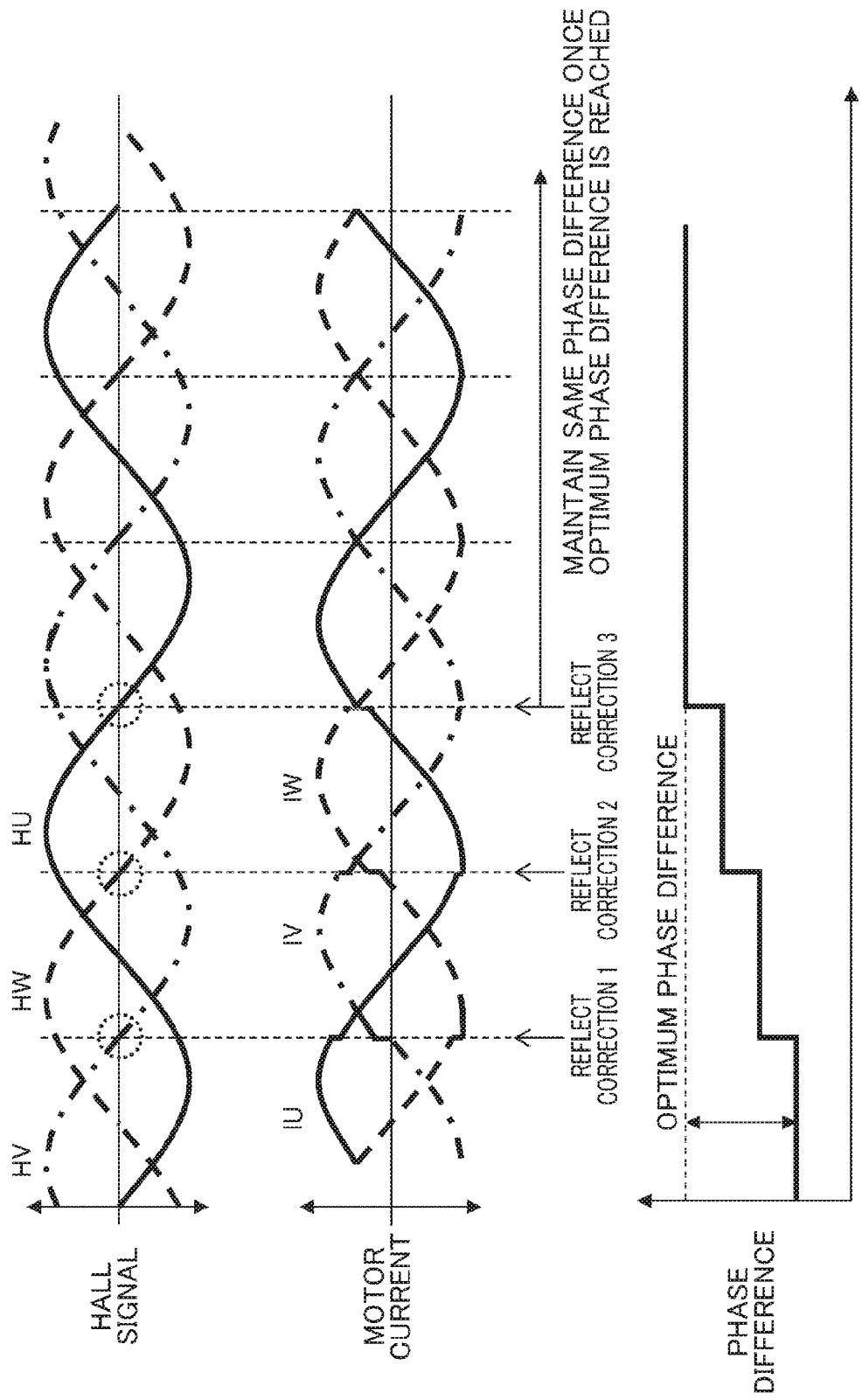
FIG. 13 is a timing chart illustrating the motor driver and control method according to the tenth embodiment.

FIG. 13 is a timing chart illustrating a motor driver and control method according to this embodiment. In the example illustrated in FIG. 13, the phase compensation is performed in multiple stages as in the third embodiment. The phase difference is optimized at the timing of Reflect Correction 3. Thus, the phase correction value calculator 1001 no longer calculates any correction values after that, but maintains, and keeps outputting, the correction value calculated at the timing of Reflect Correction 3.

Although a similar situation to the one described for the third embodiment is illustrated in FIG. 13, naturally this is not the only situation but is just an example.

Eleventh Embodiment

In a motor driver according to an eleventh embodiment, the phase correction value calculator 1001 may perform compensation again if the drive period of the motor has changed.

Figure 14:
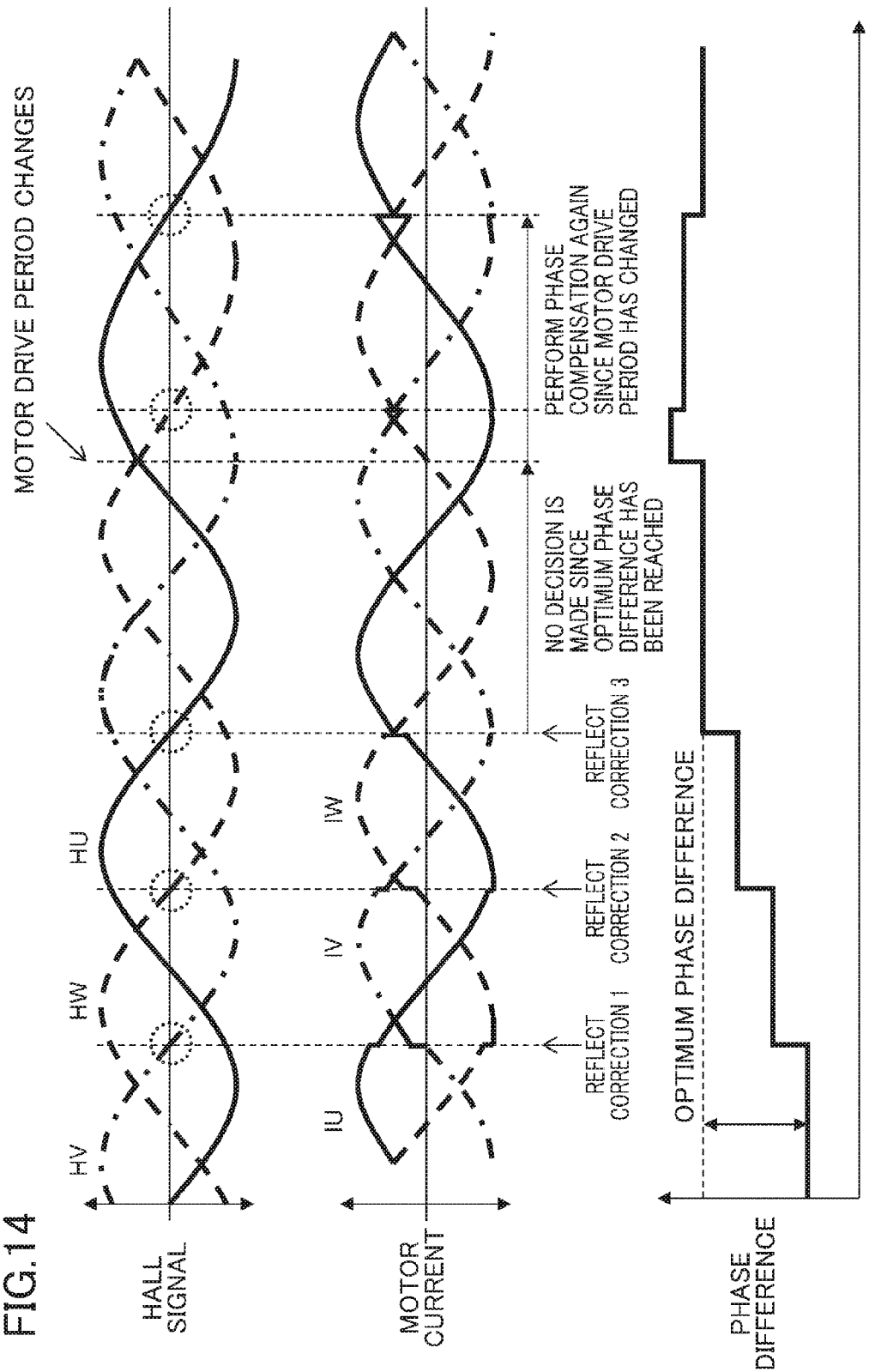
FIG. 14 is a timing chart illustrating a motor driver and control method according to an eleventh embodiment.

FIG. 14 is a timing chart illustrating a motor driver and control method according to this embodiment. In the example illustrated in FIG. 14, the phase compensation is performed in multiple stages as in the third embodiment. The phase difference is optimized at the timing of Reflect Correction 3. Thus, the phase correction value calculator 1001 no longer calculates any correction values after that, but maintains, and keeps outputting, the correction value calculated at the timing of Reflect Correction 3. In this case, if the drive period of the motor has changed, the phase correction value calculator 1001 calculates a correction value again. When the phase difference is optimized after that, the phase correction value calculator 1001 will keep outputting the correction value at that point in time.

Although a similar situation to the one described for the third embodiment is illustrated in FIG. 14, naturally this is not the only situation but is just an example.

Twelfth Embodiment

Figure 15:
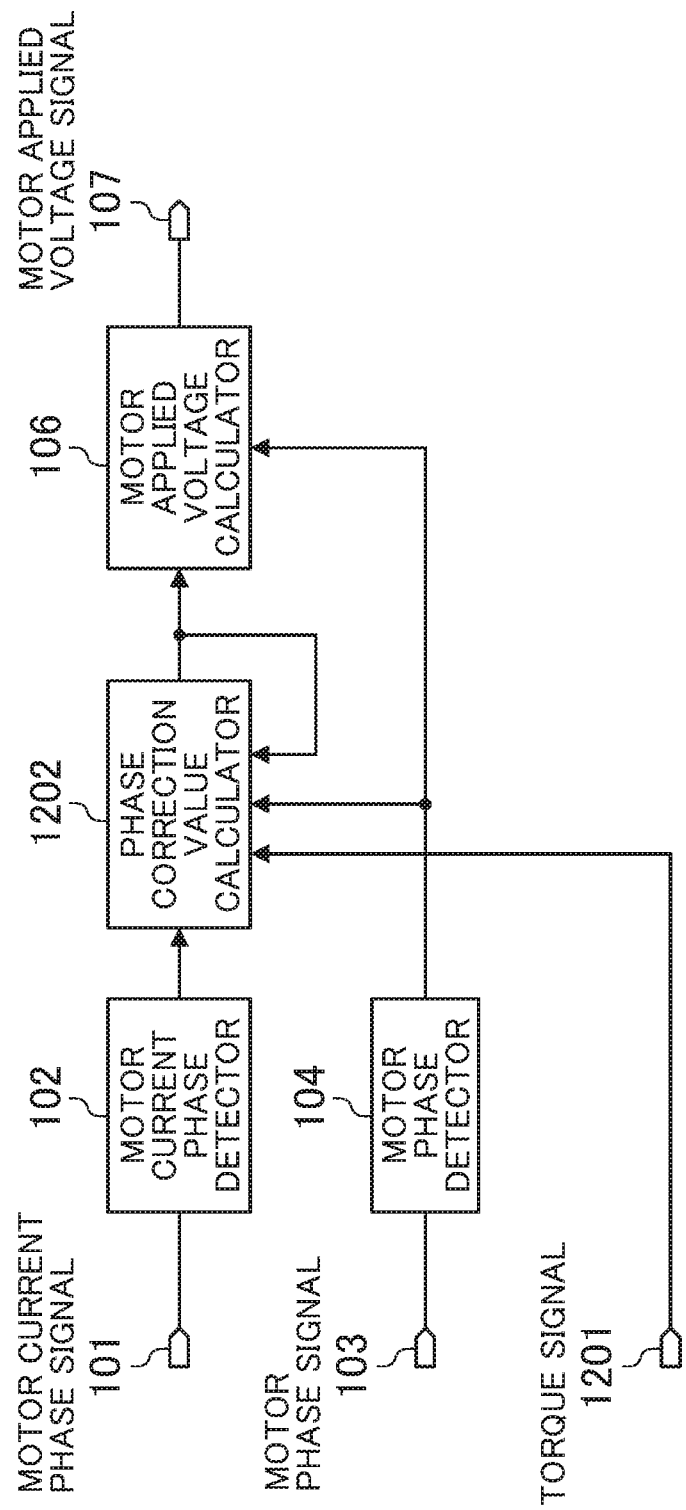
FIG. 15 is a block diagram illustrating a motor driver and control method according to a twelfth embodiment.

FIG. 15 is a block diagram illustrating a motor driver and control method according to a twelfth embodiment. In the motor driver according to this embodiment, the phase correction value calculator 1202 is configured to receive a torque signal 1201 for controlling the torque to be applied to the motor and to perform compensation again if the torque signal 1201 changes.

Figure 16:
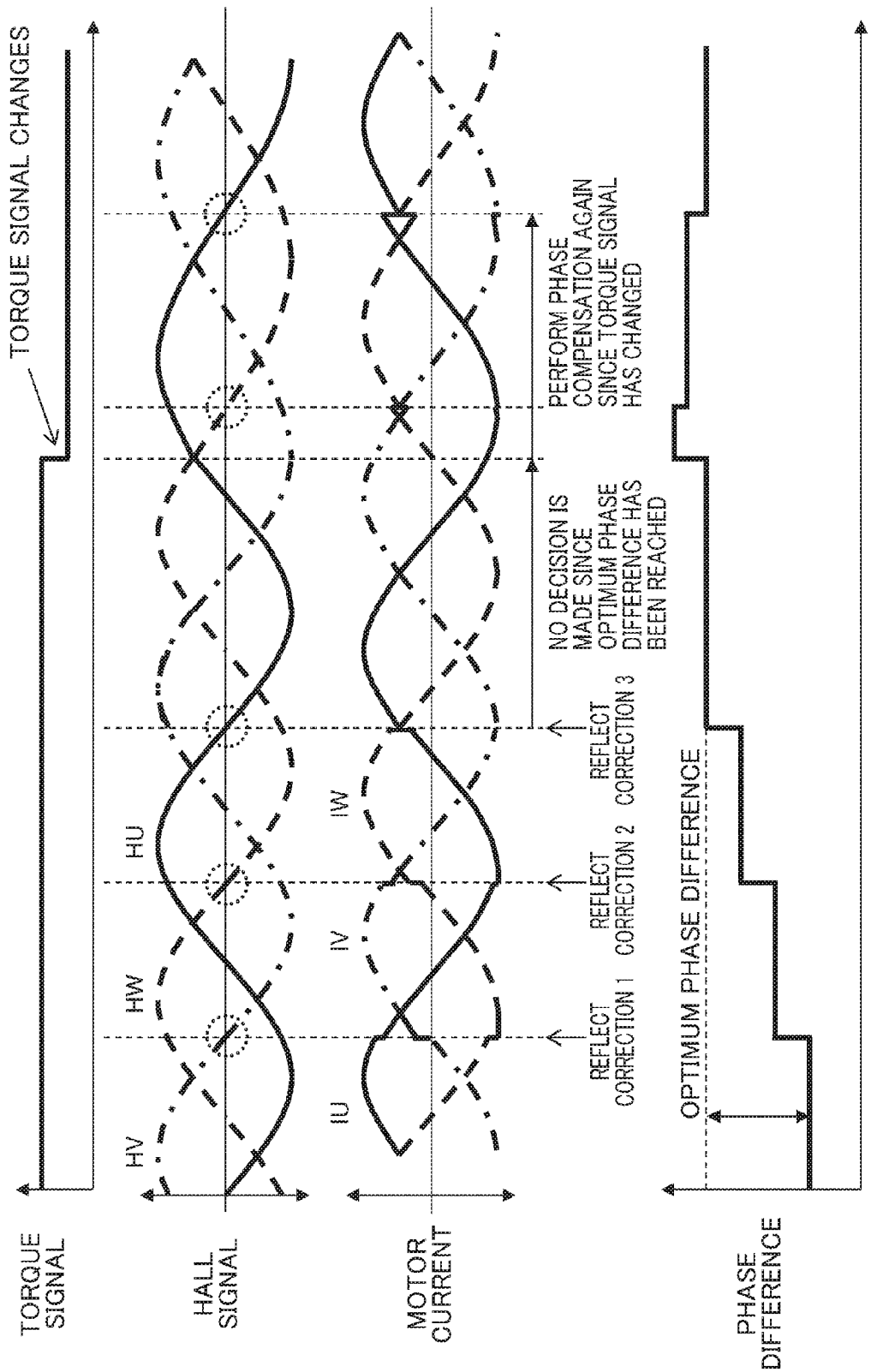
FIG. 16 is a timing chart illustrating the motor driver and control method according to the twelfth embodiment.

FIG. 16 is a timing chart illustrating the motor driver and control method according to this embodiment. In the example illustrated in FIG. 16, the phase compensation is performed in multiple stages as in the third embodiment. The phase difference is optimized at the timing of Reflect Correction 3. Thus, the phase correction value calculator 1202 no longer calculates any correction values after that, but maintains, and keeps outputting, the correction value calculated at the timing of Reflect Correction 3. In this case, if the torque instruction changes (i.e., if the torque signal 1201 changes), the phase correction value calculator 1001 calculates a correction value again.

Although a similar situation to the one described for the third embodiment is illustrated in FIG. 16, naturally this is not the only situation but is just an example.

Thirteenth Embodiment

Figure 17:
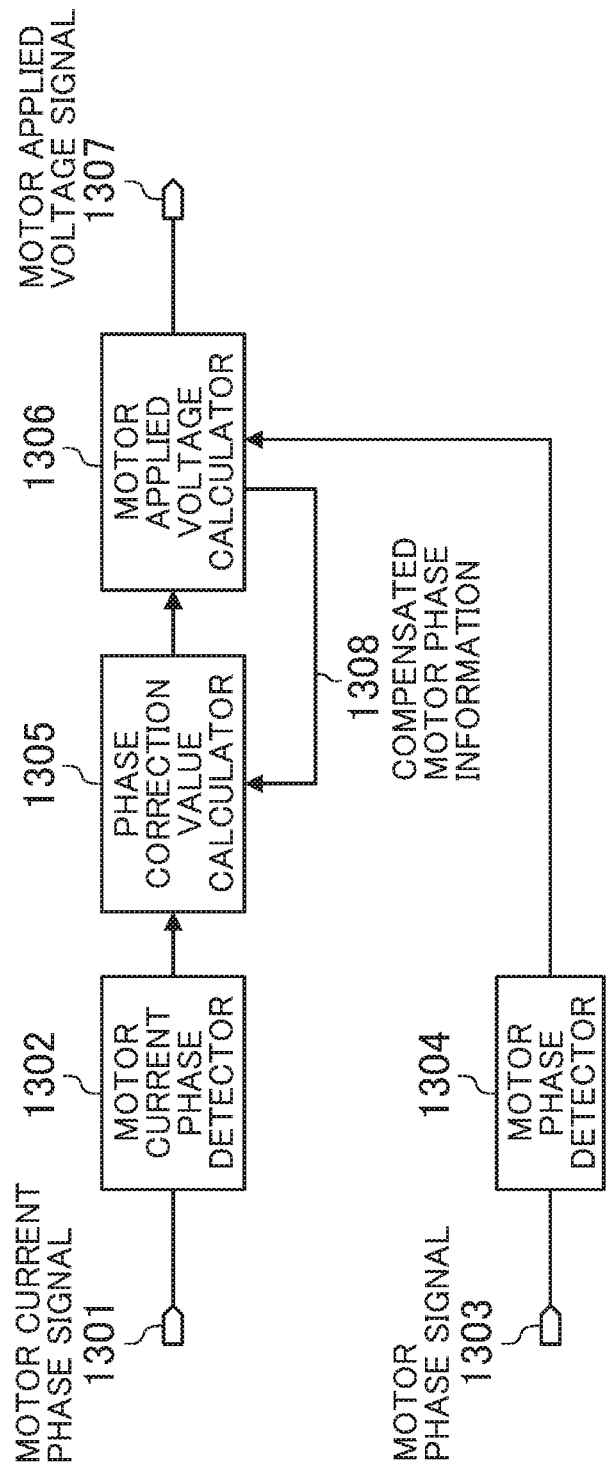
FIG. 17 is a block diagram illustrating a motor driver and control method according to a thirteenth embodiment.

FIG. 17 is a block diagram illustrating a motor driver and control method according to a thirteenth embodiment. The motor driver shown in FIG. 17 includes: a motor current phase detector 1302 which detects a motor current phase in response to a motor current phase signal 1301 received and outputs a result of the detection as motor current phase information; a motor phase detector 1304 which detects a motor phase in response to a motor phase signal 1303 received and outputs motor phase information as a result of the detection; a phase correction value calculator 1305 which calculates a correction value to perform compensation on the phase of the motor based on the difference between the motor current phase information and compensated motor phase information and outputs compensation information as a result of the calculation; and a motor applied voltage calculator 1306 which calculates a motor applied voltage representing a voltage to be applied to the motor based on the compensation information and motor phase information received and outputs a phase-compensated motor applied voltage signal 1307 and the compensated motor phase information 1308 as a result of the calculation.

The motor driver shown in FIG. 17 may perform compensation on the motor phase by performing a control operation in the following manner, for example.

When the motor current phase signal 1301 is input to the motor current phase detector 1302, the motor current phase detector 1302 outputs the motor current phase information. Meanwhile, when the motor phase signal 1303 is input to the motor phase detector 1304, the motor phase detector 1304 outputs the motor phase information. The phase correction value calculator 1305 compares the motor current phase information and the compensated motor phase information 1308 to each other, calculates such a correction value as to allow the motor current to maintain an appropriate phase difference with respect to the compensated motor phase information 1308, and outputs the correction value. When the compensation information represented as a correction value and the motor phase information are input to the motor applied voltage calculator 1306, the motor applied voltage calculator 1306 calculates the compensated motor phase information 1308 and a motor applied voltage representing a voltage to be applied to the motor and generates a phase-compensated motor applied voltage signal 1307.

Then, the motor applied voltage signal 1307 is supplied to a triphase brushless motor, for example.

By controlling the motor driver in this manner, the motor current phase and the compensated motor phase are allowed to maintain an appropriate phase difference between them such that the motor may be driven with high efficiency, irrespective of the precision of the motor phase signal. In addition, since an appropriate phase difference is maintained between the motor current phase and the compensated motor phase, this method has versatility that is broad enough to avoid depending on the characteristic of any particular motor.

Fourteenth Embodiment

In a motor driver according to a fourteenth embodiment, the motor applied voltage calculator 1306 shown in FIG. 17 may generate a motor applied voltage signal 1307 to be applied to the motor by updating the compensated motor phase information on each of arbitrary discrete motor phases.

Figure 18:
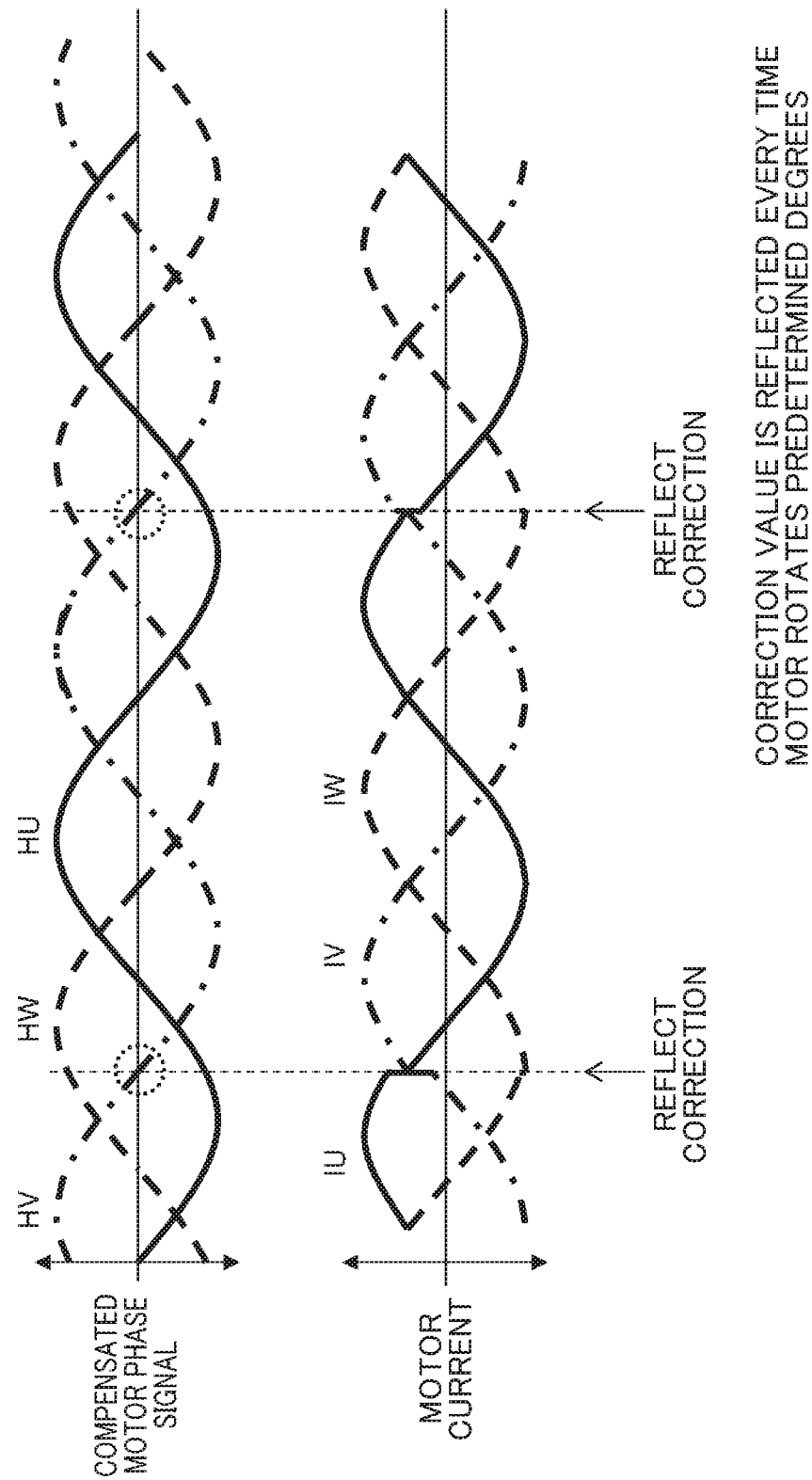
FIG. 18 is a timing chart illustrating a motor driver and control method according to a fourteenth embodiment.

FIG. 18 is a timing chart illustrating a motor driver and control method according to this embodiment. In FIG. 18, the correction value is reflected on the output applied voltage on each falling edge of the compensated motor phase signal HV, i.e., every 360 electrical degrees.

In the example illustrated in FIG. 18, the constant phase angle of the motor is supposed to be 360 electrical degrees. Naturally, however, the constant phase angle does not have to be 360 electrical degrees, but the correction value may be reflected in any arbitrary phase as well.

By adopting such a configuration, an appropriate phase difference may be maintained according to this embodiment between the motor current phase and the motor phase at every constant phase angle of the motor.

Fifteenth Embodiment

Figure 19:
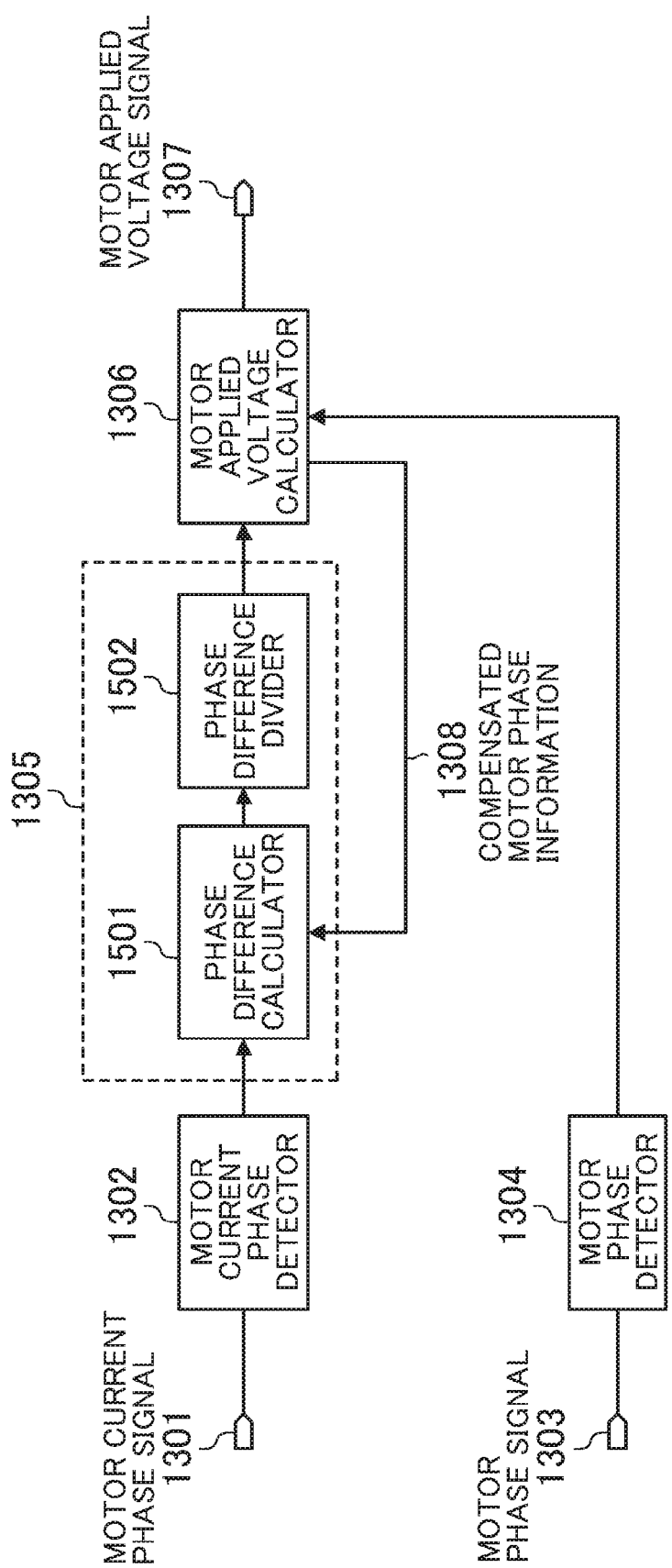
FIG. 19 is a block diagram illustrating a motor driver and control method according to a fifteenth embodiment.

FIG. 19 is a block diagram illustrating a motor driver and control method according to a fifteenth embodiment. In this embodiment, the phase correction value calculator 1305 includes a phase difference calculator 1501 and a phase difference divider 1502.

The phase difference calculator 1501 calculates a correction value based on the difference between the motor current phase information and the compensated motor phase information 1308 and outputs a result of the calculation as phase difference information that is an exemplary form of the compensation information.

The phase difference divider 1502 divides the phase difference information provided by the phase difference calculator 1501, thereby dividing the phase difference between the motor current phase information and the compensated motor phase information 1308. If the phase needs to be compensated for, the phase difference divider 1502 outputs those pieces of divided phase difference information (i.e., divided correction values) in multiple separate stages.

Figure 20:
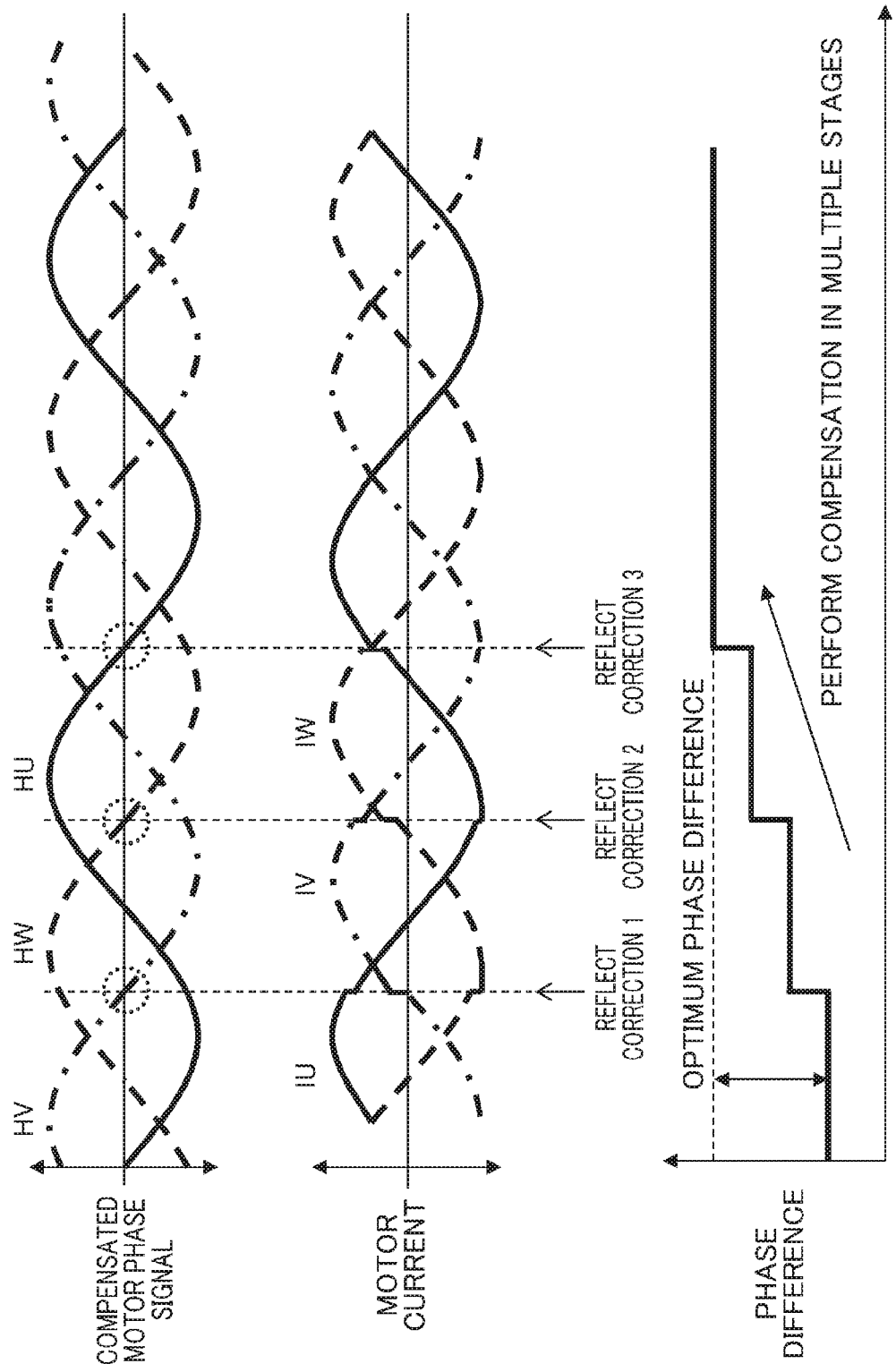
FIG. 20 is a timing chart illustrating the motor driver and control method according to the fifteenth embodiment.

FIG. 20 is a timing chart illustrating the motor driver and control method according to this embodiment. In this embodiment, the phase difference detected is compensated for by being divided into three on the respective falling edges of the compensated motor phase signals HU, HV, and HW.

Although no weights are added to the correction value to be divided, or any other additional processing is performed, in the example illustrated in FIG. 20, the correction value may naturally be divided evenly, or the correction values divided may be mutually different from each other. That is to say, the correction values divided may be set arbitrarily. Also, even though the correction value is divided into three in the example described above, this is only an example, and the correction value may also be divided into any other arbitrary number of values. Likewise, the timings to compensate for the phase difference do not have to be the respective falling edges of the compensated motor phase signals HU, HV, and HW, either, but may also be set to be any other arbitrary timings.

By adopting such a configuration, an appropriate phase difference may be maintained according to this embodiment between the motor current phase and the motor phase while drive control is performed such that the compensation is made in multiple stages.

Sixteenth Embodiment

Figure 21:
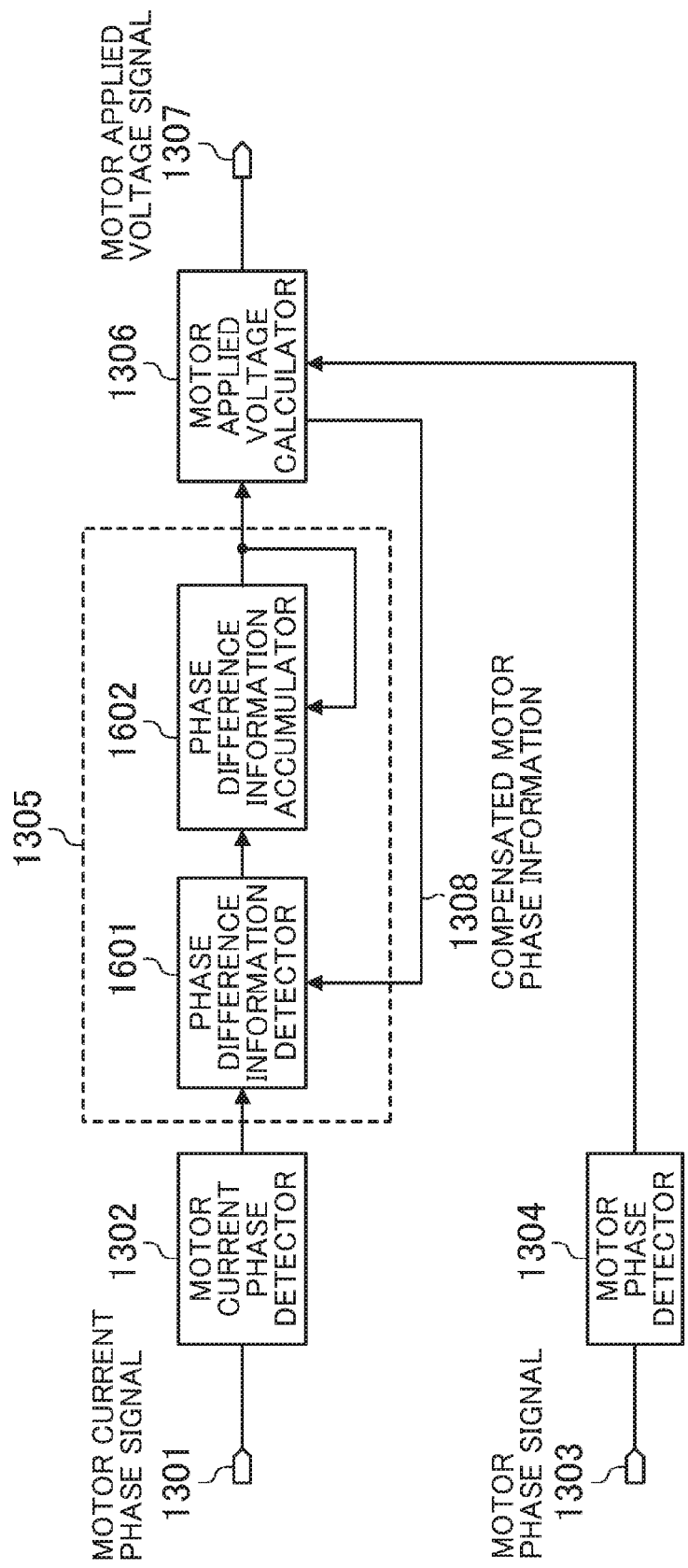
FIG. 21 is a block diagram illustrating a motor driver and control method according to a sixteenth embodiment.

FIG. 21 is a block diagram illustrating a motor driver and control method according to a sixteenth embodiment. In this embodiment, the phase correction value calculator 1305 includes a phase difference information detector 1601 and a phase difference information accumulator 1602.

The phase difference information detector 1601 detects a phase difference as either a phase lead or a phase lag based on the difference between the motor current phase information and the compensated motor phase information 1308, and outputs phase difference information as a result of the detection.

The phase difference information accumulator 1602 calculates a correction value by accumulating the phase difference information provided by the phase difference information detector 1601, retains the correction value, and outputs the correction value as compensation information.

Figure 22:
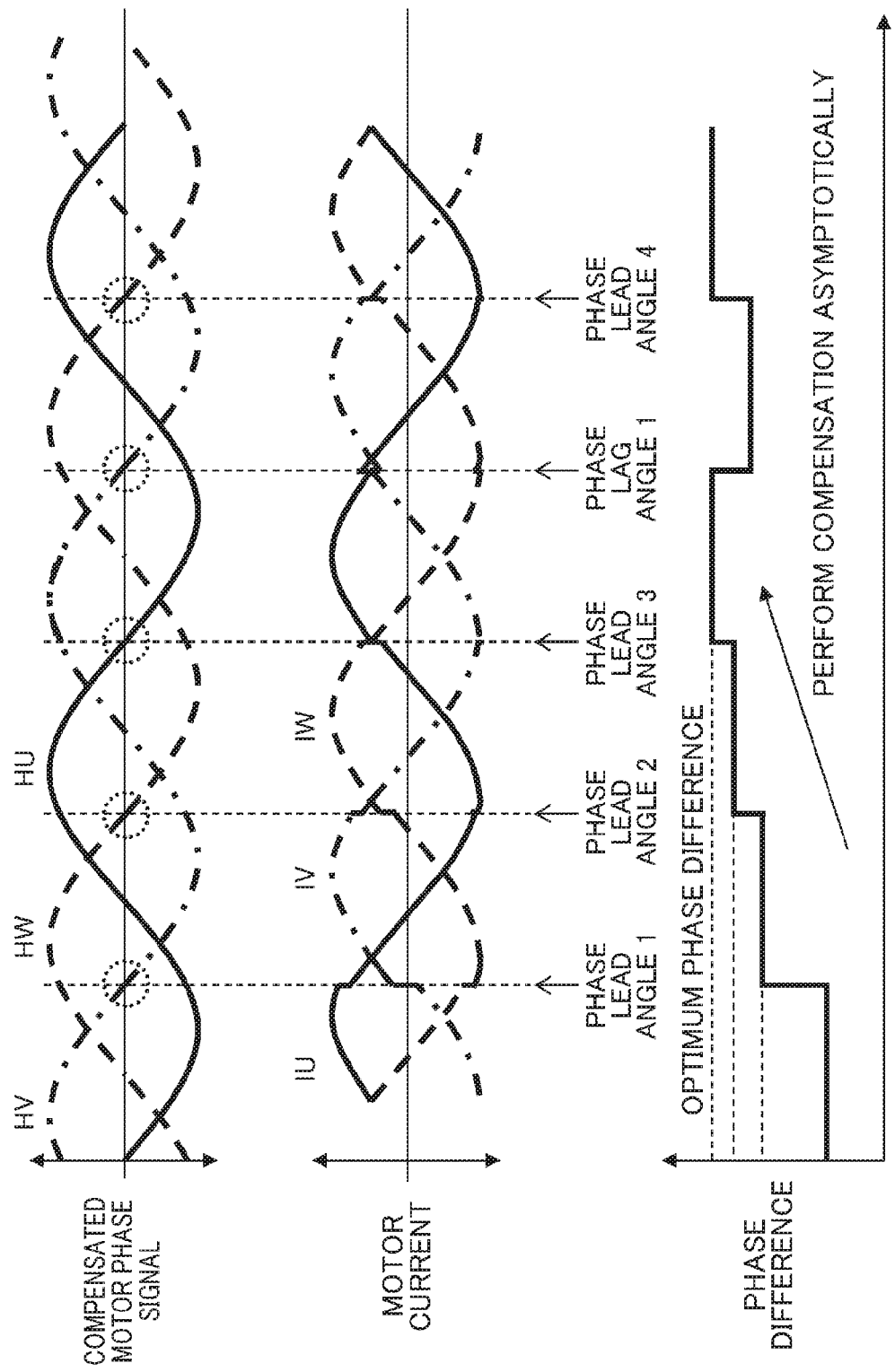
FIG. 22 is a timing chart illustrating the motor driver and control method according to the sixteenth embodiment.

FIG. 22 is a timing chart illustrating the motor driver and control method according to this embodiment. In this embodiment, the compensation is performed asymptotically such that the phase difference between the compensated motor phase signal and the motor current converges to an appropriate value on the respective falling edges of the compensated motor phase signals HU, HV, and HW. Since the phase difference information is about a phase difference that is either a phase lead or a phase lag, the convergence is achieved with certain amplitude.

In the example illustrated in FIG. 22, weights are supposed to be added to the asymptotic correction values. Naturally, however, the asymptotic correction values may be either equal to each other or different from each other, and may be set arbitrarily. In addition, the timings to compensate for the phase difference do not have to be the falling edges of the compensated motor phase signals HU, HV, HW, but may also be set to be any arbitrary timings.

By adopting such a configuration, an appropriate phase difference may be maintained according to this embodiment between the motor current phase and the motor phase with drive control performed such that the compensation is performed asymptotically.

Seventeenth Embodiment

In a seventeenth embodiment, the phase difference information detector 1601 of the phase correction value calculator 1305 shown in FIG. 21 may detect a phase difference as a phase lead, a phase lag or a phase match based on the difference between the motor current phase information and the motor phase information, and may output phase difference information as a result of the detection.

Figure 23:
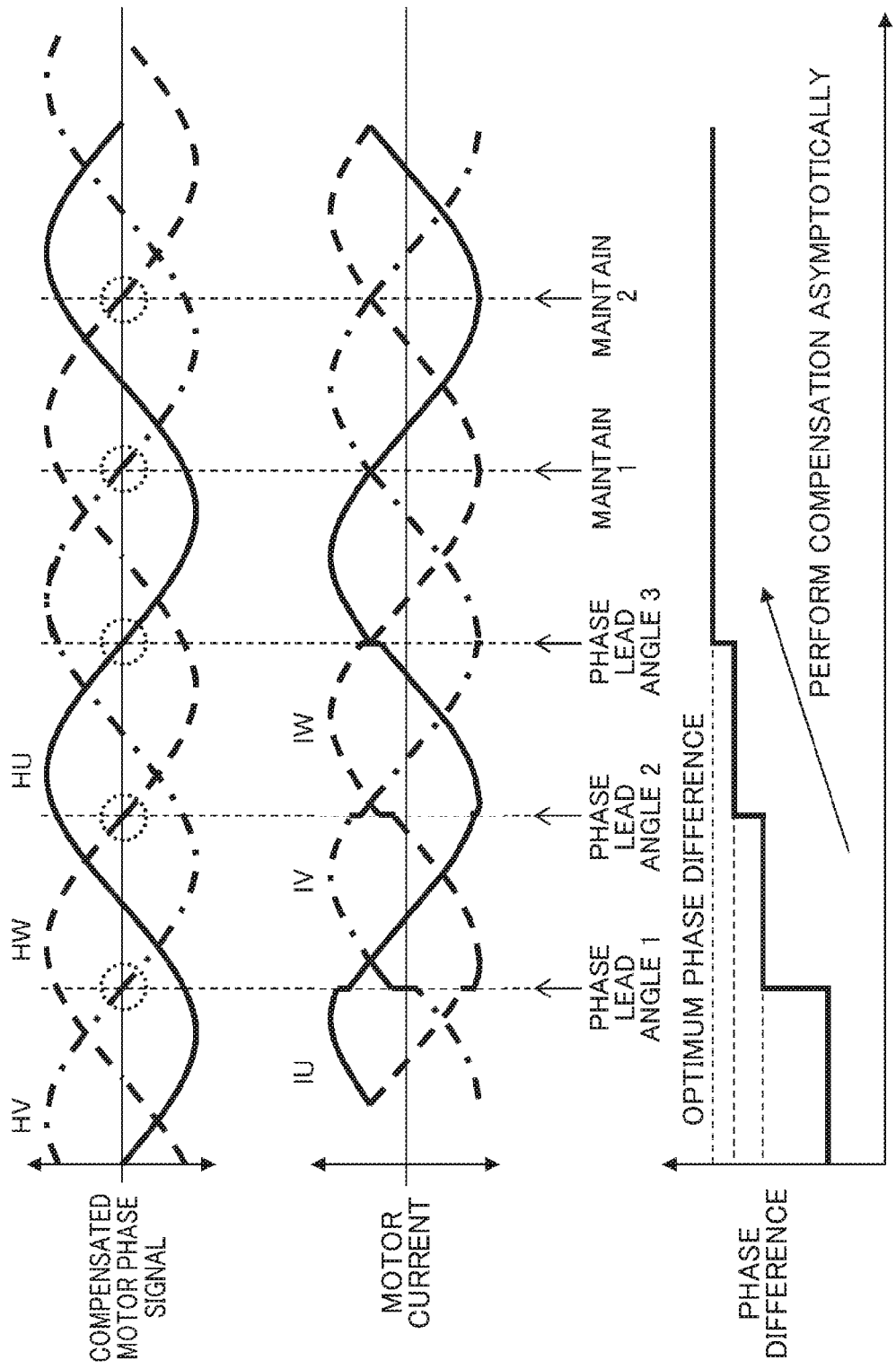
FIG. 23 is a timing chart illustrating a motor driver and control method according to a seventeenth embodiment.

FIG. 23 is a timing chart illustrating a motor driver and control method according to this embodiment. In this embodiment, the compensation is performed asymptotically such that the phase difference between the compensated motor phase signals and the motor current converges to an appropriate value on the respective falling edges of the compensated motor phase signals HU, HV, and HW. An appropriate phase difference will be maintained by outputting a maintaining signal from the phase difference information detector 1601 once the phase difference has converged to an appropriate value.

In the example illustrated in FIG. 23, weights are supposed to be added to the asymptotic correction values. Naturally, however, the asymptotic correction values may be either equal to each other or different from each other, and may be set arbitrarily. In addition, the timings to compensate for the phase difference do not have to be the falling edges of the compensated motor phase signals HU, HV, and HW, but may also be set to be any arbitrary timings.

By adopting such a configuration, an appropriate phase difference may be maintained according to this embodiment between the motor current phase and the motor phase with drive control performed such that the compensation is performed asymptotically.

Eighteenth Embodiment

In a motor driver according to an eighteenth embodiment, the phase correction value calculator 1305 shown in FIG. 17 may fetch the motor current phase information at arbitrary discrete timings.

Figure 24:
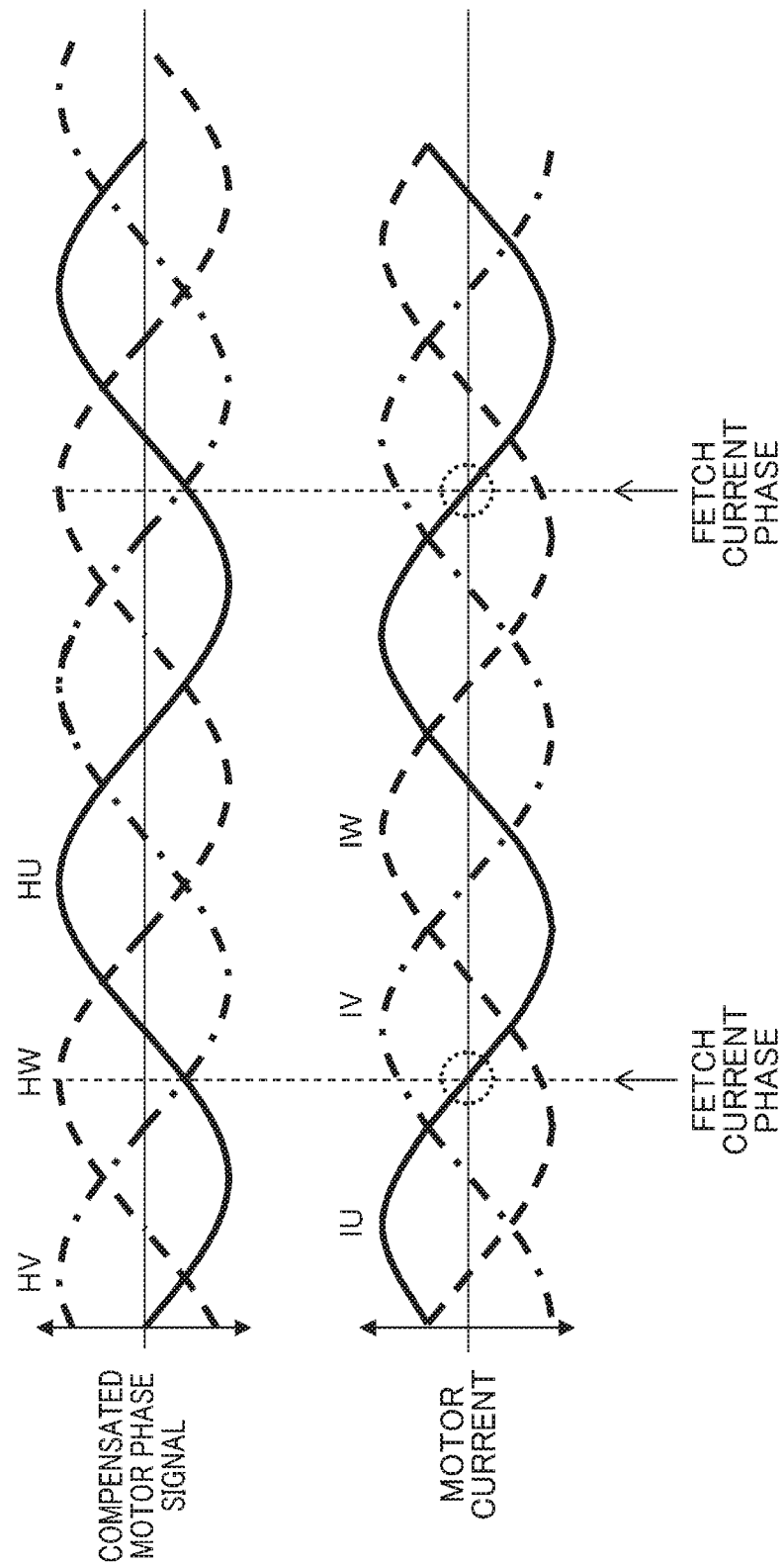
FIG. 24 is a timing chart illustrating a motor driver and control method according to an eighteenth embodiment.

FIG. 24 is a timing chart illustrating a motor driver and control method according to this embodiment. In the example illustrated in FIG. 24, the motor current phase information is supposed to be fetched on every falling edge of motor current IU.

Although the motor current phase information is supposed to be fetched in FIG. 24 on every falling edge of motor current IU, the motor current phase information naturally does not have to be fetched on every falling edge of the motor current IU, but may also be fetched at any arbitrary discrete timings as well.

By adopting such a configuration, the motor current phase information may be updated discretely according to this embodiment, and therefore, an appropriate phase difference may be maintained between the motor current phase and the motor phase.

Nineteenth Embodiment

In a motor driver according to a nineteenth embodiment, the phase correction value calculator 1305 shown in FIG. 17 may determine the timing to fetch the motor current phase information based on compensated motor phase information.

Figure 25:
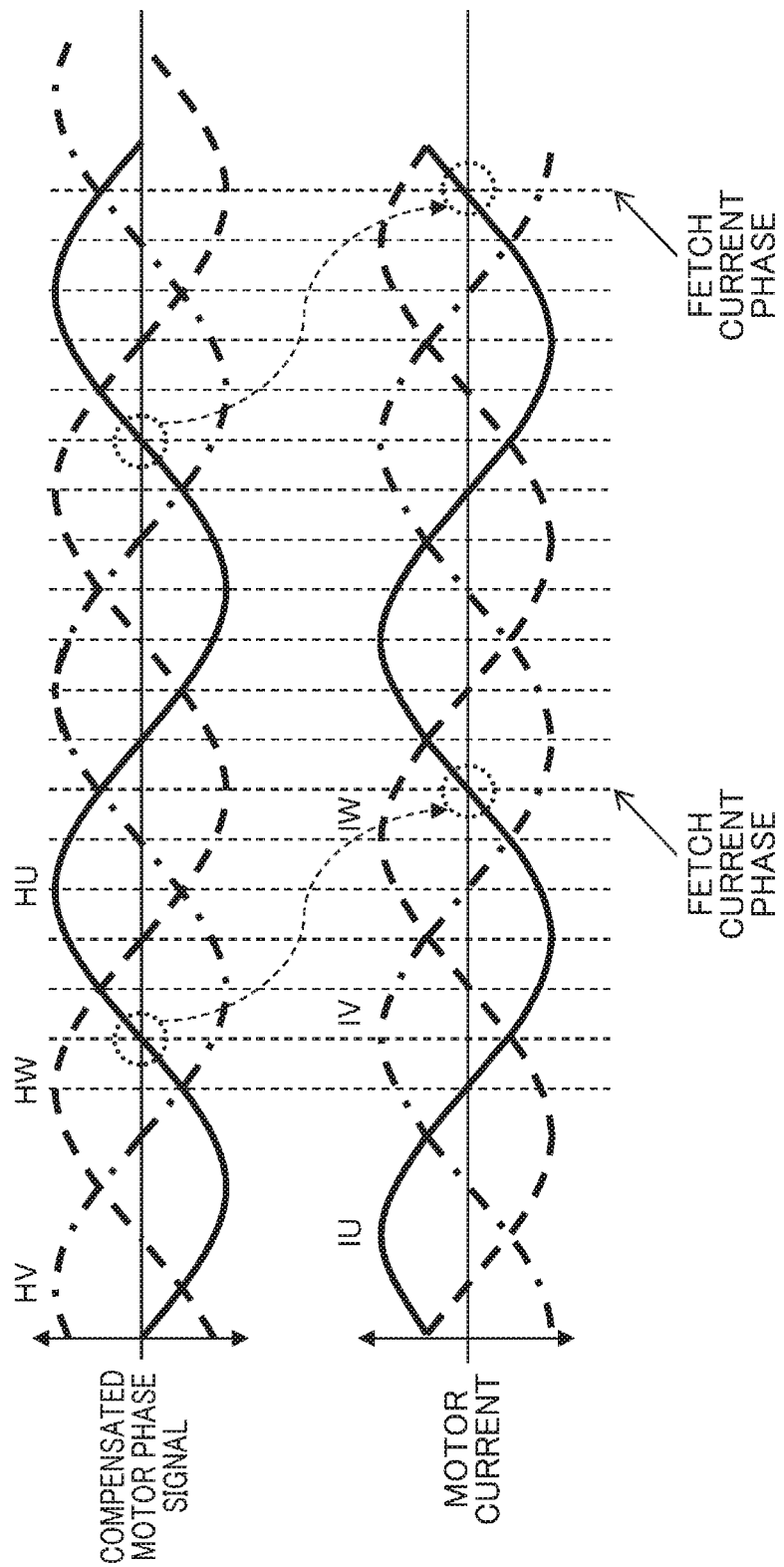
FIG. 25 is a timing chart illustrating a motor driver and control method according to a nineteenth embodiment.

FIG. 25 is a timing chart illustrating a motor driver and control method according to this embodiment. In the example illustrated in FIG. 25, the motor current phase information of the motor current IU is fetched at a timing represented by an electrical angle of around 150 degrees with respect to a rising edge of the compensated motor phase signal HU.

Although an exemplary combination of the compensated motor phase signal HU and the motor current IU is illustrated in FIG. 25, naturally this is not the only combination. Rather, the timings may also be set based on any other combination of an arbitrary motor current phase and an arbitrary compensated motor phase signal or a combination of multiple motor current phases and multiple compensated motor phase signals.

By adopting such a configuration, the motor current phase information may be updated according to this embodiment at a timing determined based on the compensated motor phase information, and an appropriate phase difference may be maintained between the motor current phase and the motor phase.

Twentieth Embodiment

In a motor driver according to a twentieth embodiment, the motor phase detector 1304 shown in FIG. 17 may output present motor phase information based on past motor phases.

Figure 26:
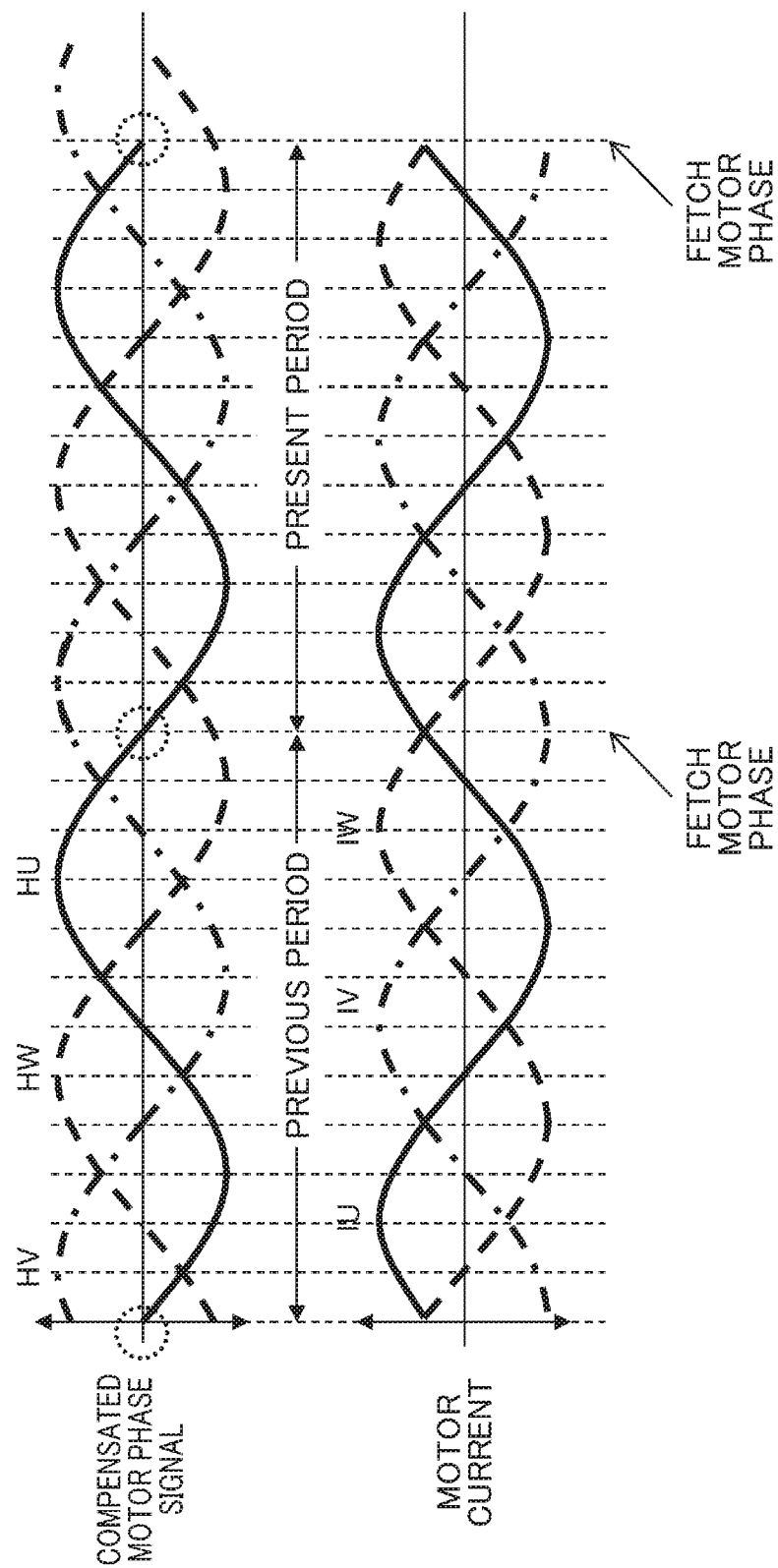
FIG. 26 is a timing chart illustrating a motor driver and control method according to a twentieth embodiment.

FIG. 26 is a timing chart illustrating a motor driver and control method according to this embodiment. In the example illustrated in FIG. 26, the motor phase information is updated on the falling edges of the compensated motor phase signal HU such that the period between a first pair of falling edges of the compensated motor phase signal HU is almost as long as the period between a second pair of falling edges of the compensated motor phase signal HU.

In the example illustrated in FIG. 26, the next motor phase information is supposed to be updated based on the previous period of the compensated motor phase signal HU. Naturally, however, the previous period does not have to be used. Alternatively, the average of a few past periods may also be used, for example. Furthermore, the compensated motor phase signal to use may also be any arbitrary signal or any arbitrary set of signals. For example, the motor phase information may be updated between the respective falling edges of different compensated motor phase signals HU and HV. Moreover, the timing to update the motor phase information may also be any arbitrary timing as well.

Twenty-First Embodiment

In a motor driver according to a twenty-first embodiment, the phase correction value calculator 1305 shown in FIG. 17 may calculate a correction value by detecting the difference between the motor current phase information and the compensated motor phase information plural times for single phase compensation.

Figure 27:
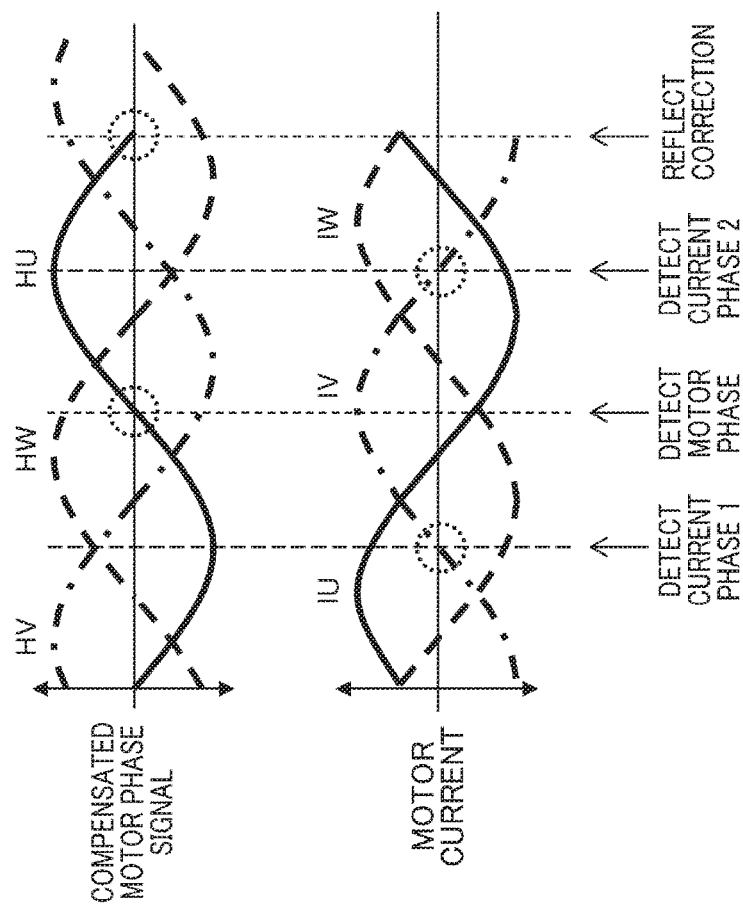
FIG. 27 is a timing chart illustrating a motor driver and control method according to a twenty-first embodiment.

FIG. 27 is a timing chart illustrating a motor driver and control method according to this embodiment. In the example illustrated in FIG. 27, the motor current phase information on rising and falling edges of the motor current IV is compared to the motor phase information on a rising edge of the compensated motor phase signal HU, and the correction value is reflected on a falling edge of the compensated motor phase signal HU.

In the example illustrated in FIG. 27, a correction value is calculated using the compensated motor phase signal HU and the motor current IV within one period of the compensated motor phase signal HU. Naturally, however, any arbitrary signal or any arbitrary set of signals may also be used as the compensated motor phase signal and motor current. Likewise, the correction value does not have to be calculated within one period, either, but may also be calculated either every predetermined number of periods or even every time less than one period passes. Furthermore, the motor phase information and motor current phase information may also be updated at arbitrary timings as well.

Twenty-Second Embodiment

Figure 28:
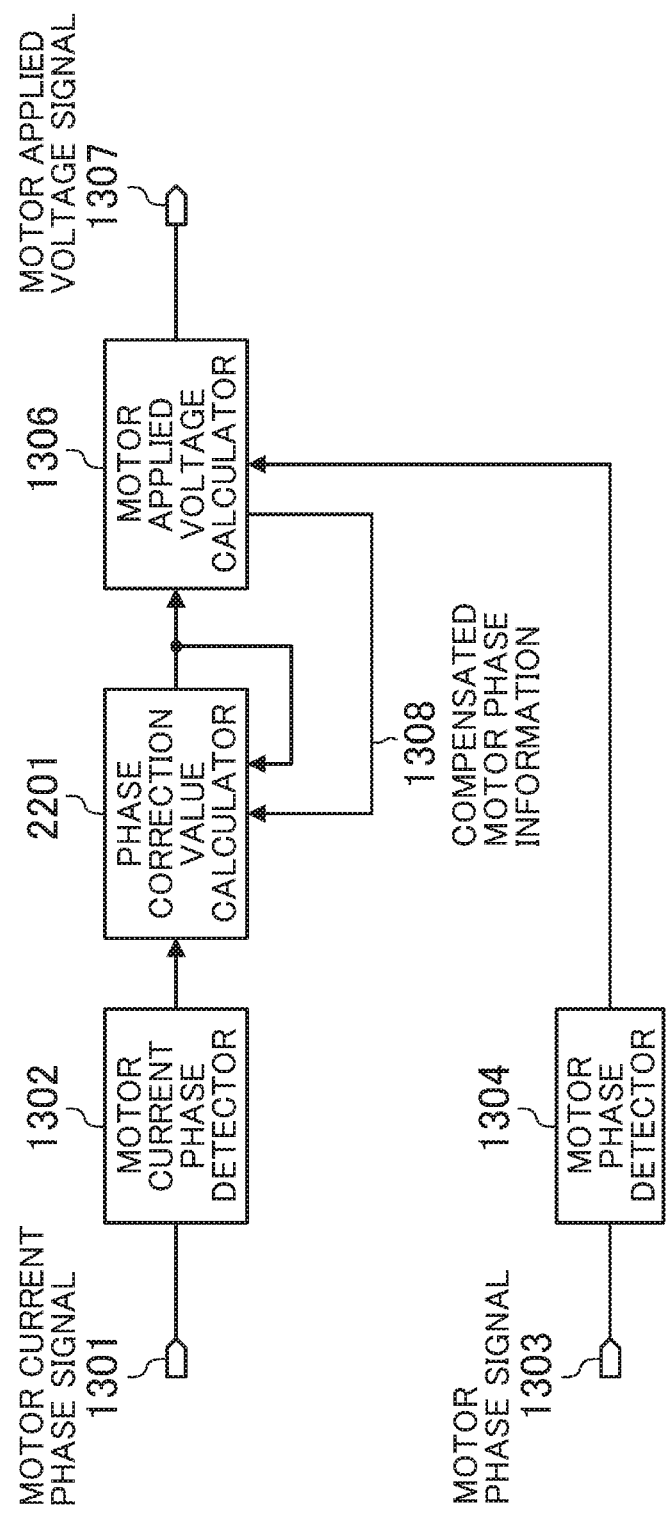
FIG. 28 is a block diagram illustrating a motor driver and control method according to a twenty-second embodiment.

FIG. 28 is a block diagram illustrating a motor driver and control method according to a twenty-second embodiment.

In the motor driver according to the twenty-second embodiment, the phase correction value calculator 2201 is configured to maintain, once a phase difference between the motor current phase and the compensated motor phase reaches a predetermined value, that phase difference after that. As used herein, the "predetermined value" refers to an appropriate phase difference between the motor current phase information and the motor phase information when a motor is driven, for example.

Figure 29:
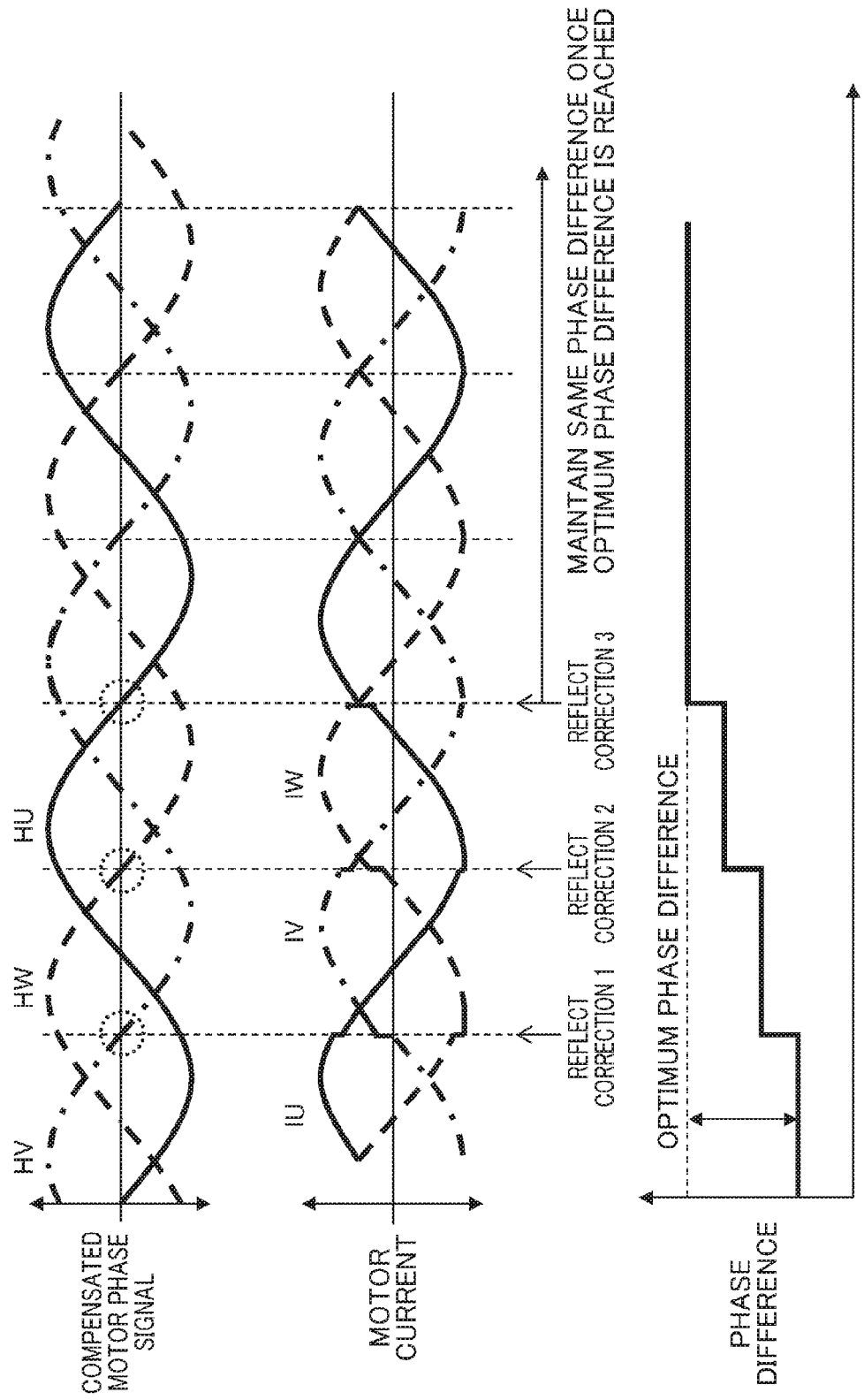
FIG. 29 is a timing chart illustrating a motor driver and control method according to the twenty-second embodiment.

FIG. 29 is a timing chart illustrating the motor driver and control method according to this embodiment. In the example illustrated in FIG. 29, the phase compensation is performed in multiple stages as in the fifteenth embodiment. The phase difference is optimized at the timing of Reflect Correction 3. Thus, the phase correction value calculator 2201 no longer calculates any correction values after that, but maintains, and keeps outputting, the correction value calculated at the timing of Reflect Correction 3.

Although a similar situation to the one described for the fifteenth embodiment is illustrated in FIG. 29, naturally this is not the only situation but is just an example.

Twenty-Third Embodiment

In a motor driver according to a twenty-third embodiment, the phase correction value calculator 2201 shown in FIG. 28 may perform compensation again if the drive period of the motor has changed.

Figure 30:
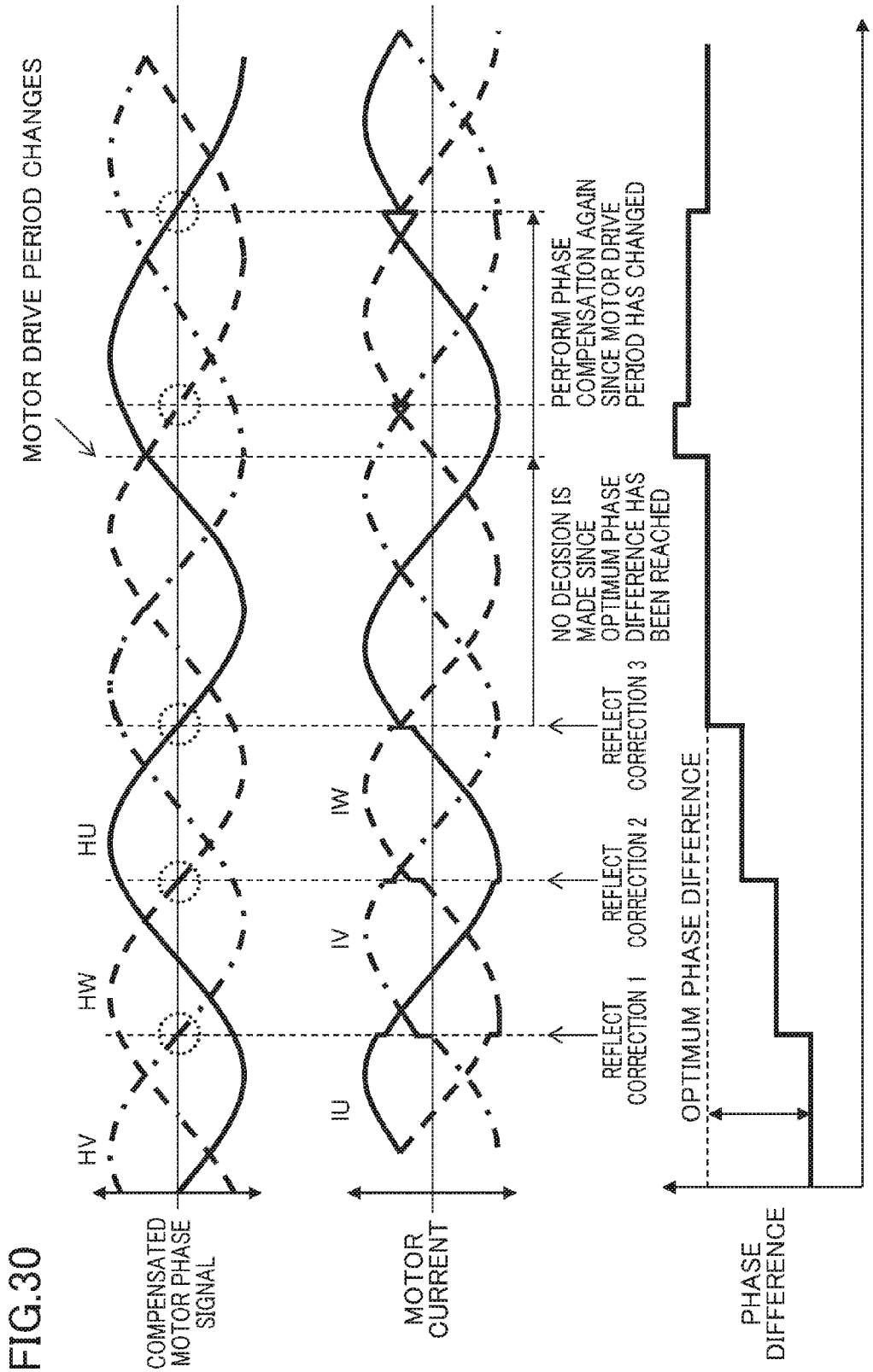
FIG. 30 is a timing chart illustrating a motor driver and control method according to a twenty-third embodiment.

FIG. 30 is a timing chart illustrating a motor driver and control method according to this embodiment. In the example illustrated in FIG. 30, the phase compensation is performed in multiple stages as in the fifteenth embodiment. The phase difference is optimized at the timing of Reflect Correction 3. Thus, the phase correction value calculator 2201 no longer calculates any correction values after that, but maintains, and keeps outputting, the correction value calculated at the timing of Reflect Correction 3. In this case, if the drive period of the motor has changed, the phase correction value calculator 2201 calculates a correction value again.

Although a similar situation to the one described for the fifteenth embodiment is illustrated in FIG. 30, naturally this is not the only situation but is just an example.

Twenty-Fourth Embodiment

Figure 31:
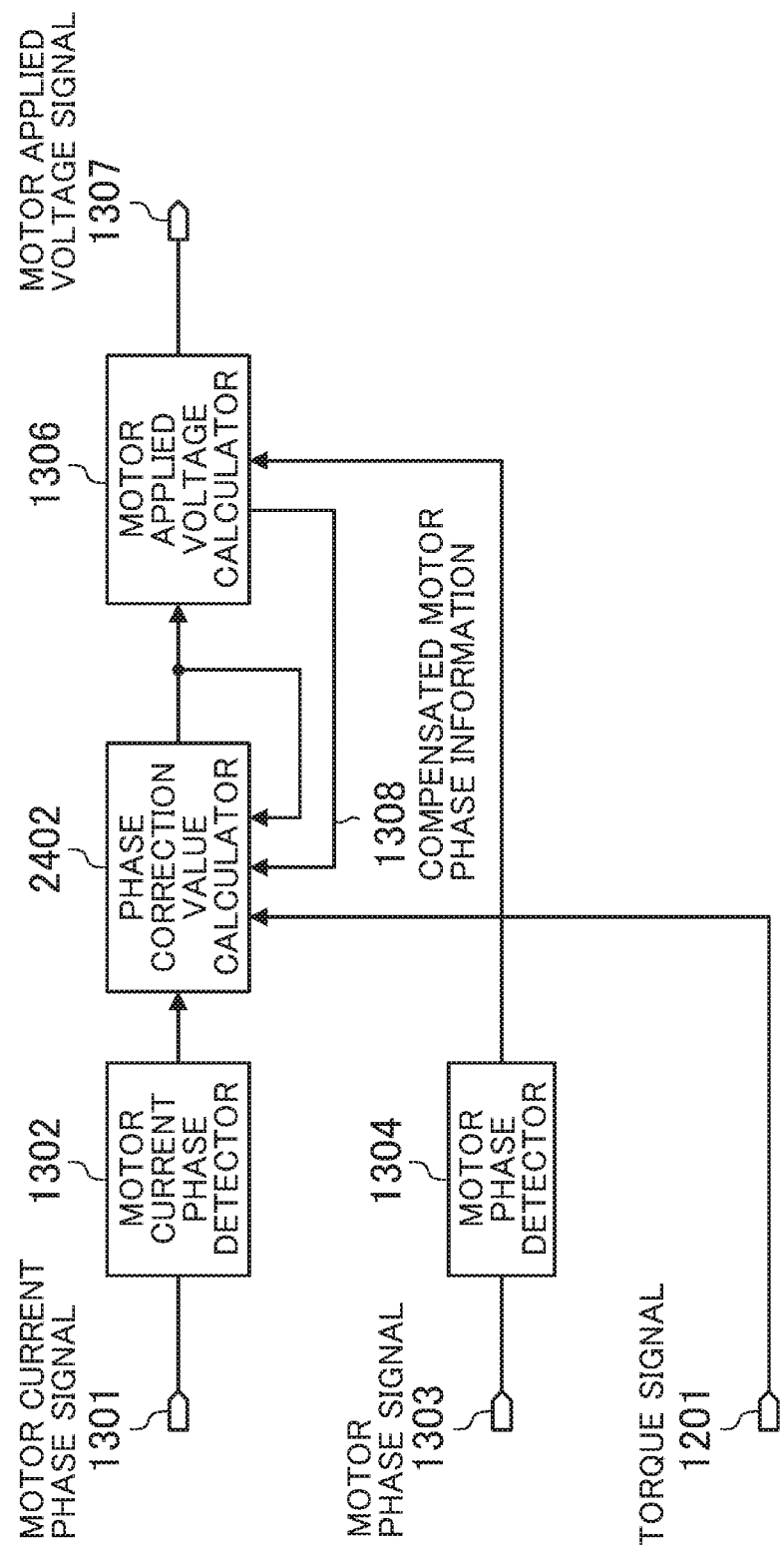
FIG. 31 is a block diagram illustrating a motor driver and control method according to a twenty-fourth embodiment.

FIG. 31 is a block diagram illustrating a motor driver and control method according to a twenty-fourth embodiment. In the motor driver according to this embodiment, the phase correction value calculator 2402 is configured to receive a torque signal 1201 for controlling the torque to be applied to the motor and to perform compensation again if the torque signal 1201 changes.

Figure 32:
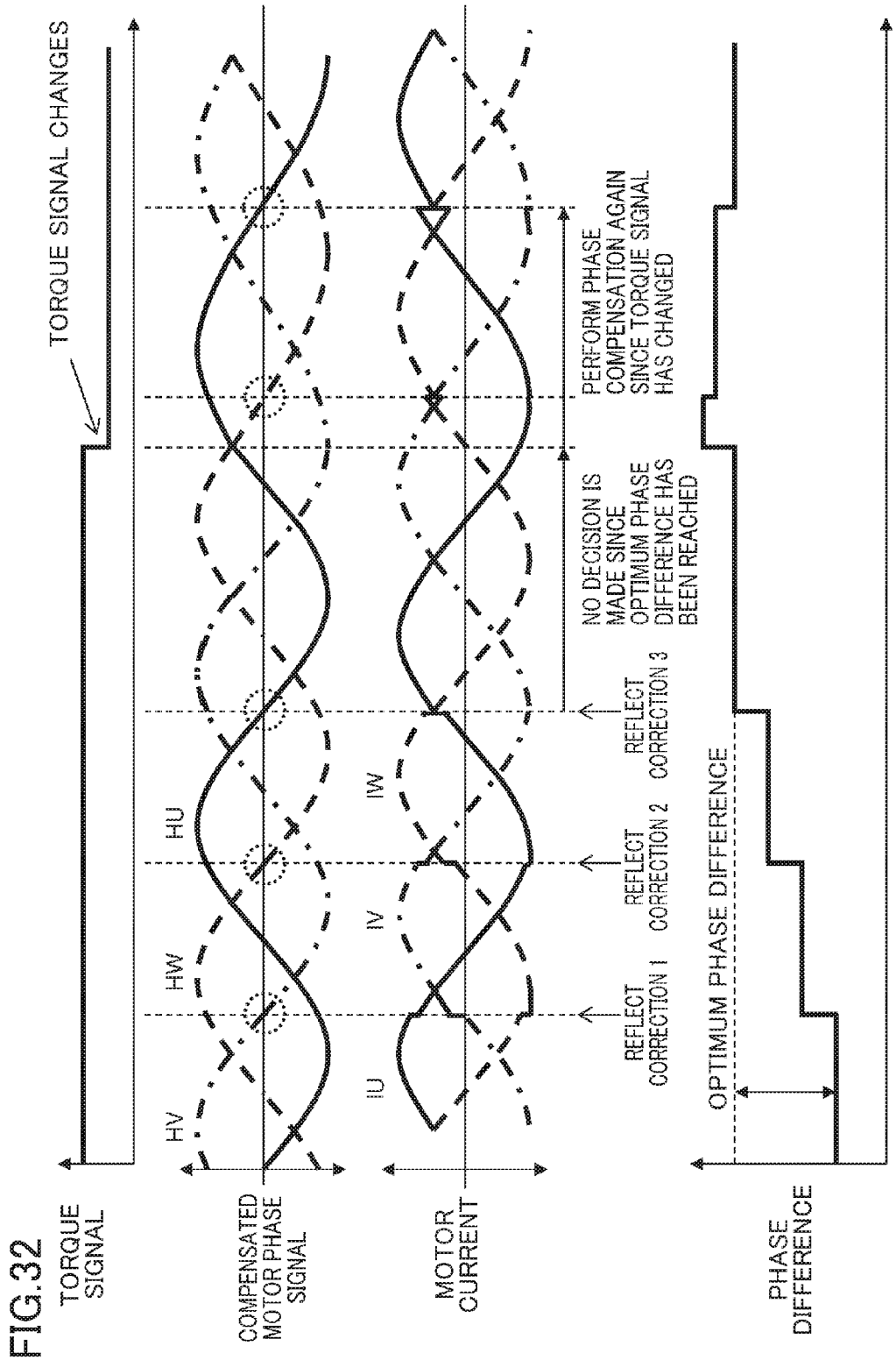
FIG. 32 is a timing chart illustrating the motor driver and control method according to the twenty-fourth embodiment.
Figure 33:
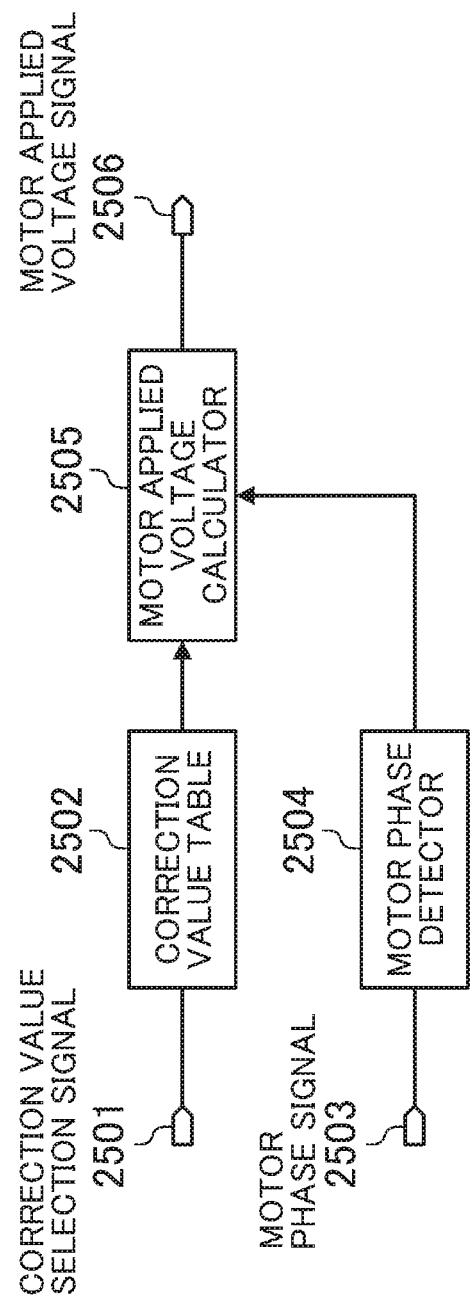
FIG. 33 is a block diagram illustrating a conventional motor driver and control method.
Figure 34B:
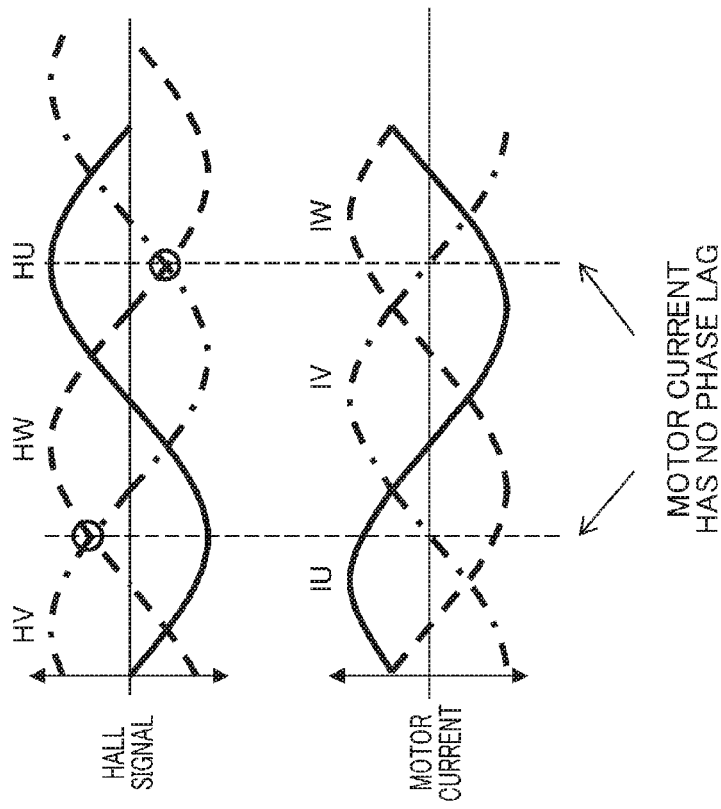
FIGS. 34A and 34B are timing charts illustrating the conventional motor driver and control method.
Figure 34A:
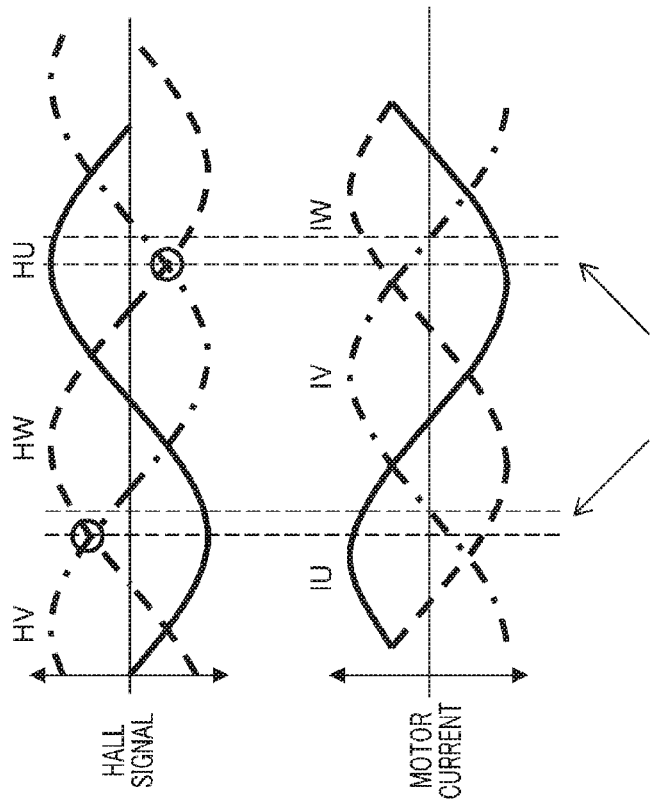

FIG. 32 is a timing chart illustrating the motor driver and control method according to this embodiment. In the example illustrated in FIG. 32, the phase compensation is performed in multiple stages as in the fifteenth embodiment. The phase difference is optimized at the timing of Reflect Correction 3. Thus, the phase correction value calculator 2402 no longer calculates any correction values after that, but maintains, and keeps outputting, the correction value calculated at the timing of Reflect Correction 3. In this case, if the torque instruction changes (i.e., if the torque signal 1201 changes), the phase correction value calculator 2402 calculates a correction value again.

Although a similar situation to the one described for the fifteenth embodiment is illustrated in FIG. 32, naturally this is not the only situation but is just an example.

The present disclosure provides a technique for driving a motor highly efficiently without depending on the characteristic of any particular motor, and therefore, is useful for a motor drive and control method, for example.

The invention claimed is:

1. A motor driver for driving a motor, the driver comprising:
a motor current phase detector configured to detect a motor current phase in response to a motor current phase signal received and output a result of the detection as motor current phase information;
a motor phase detector configured to detect a motor phase in response to a motor phase signal received and output a result of the detection as motor phase information;
a phase correction value calculator configured to calculate a correction value based on a difference between the motor current phase information and the motor phase information and output a result of the calculation as compensation information; and
a motor applied voltage calculator configured to calculate a motor applied voltage representing a voltage to be applied to the motor based on the compensation information and motor phase information received and output a result of the calculation as a phase-compensated motor applied voltage signal,
wherein the phase correction value calculator includes:
a phase difference information detector configured to detect a phase difference as a phase lead, a phase lag or a phase match based on the difference between the motor current phase information and the motor phase information, and output a result of the detection as phase difference information; and
a phase difference information accumulator configured to calculate the correction value by accumulating the phase difference information received and output a result of the calculation as the compensation information.

2. The motor driver of claim 1, wherein the motor applied voltage calculator performs phase compensation on each of arbitrary discrete phases of the motor.

3. The motor driver of claim 1, wherein the phase correction value calculator fetches the motor current phase information at arbitrary discrete timings.

4. The motor driver of claim 1, wherein the phase correction value calculator determines a timing to fetch the motor current phase information in accordance with the motor phase information.

5. The motor driver of claim 1, wherein the motor phase detector outputs the motor phase information based on past phases of the motor.

6. A motor driver for driving a motor, the driver comprising:
a motor current phase detector configured to detect a motor current phase in response to a motor current phase signal received and output a result of the detection as motor current phase information;
a motor phase detector configured to detect a motor phase in response to a motor phase signal received and output a result of the detection as motor phase information;
a phase correction value calculator configured to calculate a correction value based on a difference between the motor current phase information and the motor phase information and output a result of the calculation as compensation information; and
a motor applied voltage calculator configured to calculate a motor applied voltage representing a voltage to be applied to the motor based on the compensation information and motor phase information received and output a result of the calculation as a phase-compensated motor applied voltage signal,
wherein the phase correction value calculator calculates the correction value based on a difference between the motor current phase information and compensated motor phase information and outputs a result of the calculation as compensation information, and
the motor applied voltage calculator outputs the compensated motor phase information based on the compensation information and motor phase information received, calculates the motor applied voltage representing the voltage to be applied to the motor, and outputs a result of the calculation as the phase-compensated motor applied voltage signal.

7. The motor driver of claim 6, wherein the phase correction value calculator includes:
a phase difference calculator configured to calculate the correction value based on the difference between the motor current phase information and the motor phase information and output a result of the calculation as the compensation information; and
a phase difference divider configured to divide the compensation information into multiple pieces of compensation information and output those pieces of divided compensation information in multiple separate stages while the phase is being compensated for.

8. The motor driver of claim 6, wherein the phase correction value calculator includes:
a phase difference information detector configured to detect a phase difference as either a phase lead or a phase lag based on the difference between the motor current phase information and the motor phase information, and output a result of the detection as phase difference information; and
a phase difference information accumulator configured to calculate the correction value by accumulating the phase difference information received and output a result of the calculation as the compensation information.

9. The motor driver of claim 6, wherein the phase correction value calculator detects the difference between the motor current phase information and the motor phase information plural times for single phase compensation.

10. The motor driver of claim 6, wherein the phase correction value calculator maintains the phase difference between the motor current phase information and the motor phase information when the phase difference reaches a predetermined value.

11. The motor driver of claim 6, wherein the phase correction value calculator calculates the correction value again if the drive period of the motor has changed.

12. The motor driver of claim 6, wherein the phase correction value calculator calculates the correction value again if a torque signal received has changed, the torque signal being used to control a torque to be applied to the motor.

13. The motor driver of claim 6, wherein the motor applied voltage calculator performs phase compensation on each of arbitrary discrete phases of the motor.

14. The motor driver of claim 6, wherein
the phase correction value calculator includes:
a phase difference information detector configured to detect a phase difference as a phase lead, a phase lag or a phase match based on the difference between the motor current phase information and the motor phase information, and output a result of the detection as phase difference information; and a phase difference information accumulator configured to calculate the correction value by accumulating the phase difference information received and output a result of the calculation as the compensation information.

15. The motor driver of claim 6, wherein the phase correction value calculator fetches the motor current phase information at arbitrary discrete timings.

16. The motor driver of claim 6, wherein the phase correction value calculator determines a timing to fetch the motor current phase information in accordance with the motor phase information.

17. The motor driver of claim 6, wherein the motor phase detector outputs the motor phase information based on past phases of the motor.

18. A method of controlling a motor, the method comprising the steps of:
   i) detecting a motor current phase in response to a motor current phase signal received and outputting a result of the detection as motor current phase information;
   ii) detecting a motor phase in response to a motor phase signal received and outputting a result of the detection as motor phase information;
   iii) calculating a correction value based on a difference between the motor current phase information and the motor phase information and outputting a result of the calculation as compensation information; and
   iv) calculating a motor applied voltage representing a voltage to be applied to the motor based on the compensation information and motor phase information received and outputting a result of the calculation as a phase-compensated motor applied voltage signal,
   wherein the step iii) includes:
   detecting a phase difference as a phase lead, a phase lag or a phase match based on the difference between the motor current phase information and the motor phase information, and outputting a result of the detection as phase difference information; and
   calculating the correction value by accumulating the phase difference information received and outputting a result of the calculation as the compensation information.

19. A method of controlling a motor, the method comprising the steps of:
   i) detecting a motor current phase in response to a motor current phase signal received and outputting a result of the detection as motor current phase information;
   ii) detecting a motor phase in response to a motor phase signal received and outputting a result of the detection as motor phase information;
   iii) calculating a correction value based on a difference between the motor current phase information and the motor phase information and outputting a result of the calculation as compensation information; and
   iv) calculating a motor applied voltage representing a voltage to be applied to the motor based on the compensation information and motor phase information received and outputting a result of the calculation as a phase-compensated motor applied voltage signal,
   wherein the step iii) includes calculating the correction value based on a difference between the motor current phase information and compensated motor phase information and outputting a result of the calculation as compensation information, and
   the step iv) includes outputting the compensated motor phase information based on the compensation information and motor phase information received, calculating the motor applied voltage representing the voltage to be applied to the motor, and outputting a result of the calculation as the phase-compensated motor applied voltage signal.

* * * * *